United States Patent
Sakauchi et al.

(10) Patent No.: US 9,154,254 B2
(45) Date of Patent: Oct. 6, 2015

(54) WAVELENGTH PATH MULTIPLEXING/DEMULTIPLEXING APPARATUS AND WAVELENGTH PATH MULTIPLEXING/DEMULTIPLEXING METHOD

(75) Inventors: Masahiro Sakauchi, Tokyo (JP); Shigeru Nakamura, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 127 days.

(21) Appl. No.: 13/825,753

(22) PCT Filed: Sep. 20, 2011

(86) PCT No.: PCT/JP2011/071937
§ 371 (c)(1),
(2), (4) Date: Mar. 22, 2013

(87) PCT Pub. No.: WO2012/039503
PCT Pub. Date: Mar. 29, 2012

(65) Prior Publication Data
US 2013/0188950 A1 Jul. 25, 2013

(30) Foreign Application Priority Data
Sep. 24, 2010 (JP) .................. 2010-213551

(51) Int. Cl.
*H04J 14/02* (2006.01)
*H04Q 11/00* (2006.01)

(52) U.S. Cl.
CPC ............. *H04J 14/02* (2013.01); *H04J 14/0208* (2013.01); *H04J 14/0212* (2013.01); *H04J 14/0213* (2013.01); *H04Q 11/0005* (2013.01); *H04J 14/0284* (2013.01); *H04Q 2011/0052* (2013.01)

(58) Field of Classification Search
CPC ........................................................ H04J 14/02
USPC ....................................................... 398/48, 79
See application file for complete search history.

(56) References Cited

U.S. PATENT DOCUMENTS 5,867,289 A * 2/1999 Gerstel et al. ................... 398/12
5,973,809 A * 10/1999 Okayama ....................... 398/48
(Continued)

FOREIGN PATENT DOCUMENTS

JP 2001-318516 A 11/2001
JP 2003-218792 A 7/2003
(Continued)

OTHER PUBLICATIONS

Communication dated Apr. 1, 2014, issued by the Japanese Patent Office in corresponding Application No. 2012-535094.
(Continued)

*Primary Examiner* — David Payne
*Assistant Examiner* — Omar S Ismail
(74) *Attorney, Agent, or Firm* — Sughrue Mion, PLLC

(57) ABSTRACT

In order to connect a path and a transponder with low loss, reduce an apparatus cost, reduce an apparatus size, and improve a reliability of an apparatus, a wavelength path multiplexing/demultiplexing apparatus comprises multiplexing/demultiplexing unit having a multiplexing port through which a wavelength multiplexed light is inputted and outputted and a demultiplexing port in which the wavelength multiplexed light is demultiplexed into the lights included in the wavelength multiplexed light based on the wavelength and through which the light is inputted and outputted and first switch unit which have a first port to which the demultiplexing port is connected and a second port and connect the second port to one of the first ports; and the demultiplexing port is connected to the first port of each of the first switch unit and the first port is connected to the demultiplexing port of each of the multiplexing/demultiplexing unit.

4 Claims, 13 Drawing Sheets

(56) References Cited

U.S. PATENT DOCUMENTS

| | | | |
|---|---|---|---|
| 7,120,360 B2* | 10/2006 | Tian et al. | 398/83 |
| 7,826,741 B2* | 11/2010 | Katagiri | 398/43 |
| 2002/0141453 A1* | 10/2002 | Ghani | 370/535 |
| 2003/0156840 A1 | 8/2003 | Uchikata | |
| 2006/0034610 A1* | 2/2006 | Akiyama et al. | 398/83 |
| 2009/0190925 A1* | 7/2009 | Iizuka et al. | 398/33 |
| 2011/0116790 A1* | 5/2011 | Sakauchi et al. | 398/5 |

FOREIGN PATENT DOCUMENTS

| | | |
|---|---|---|
| JP | 2006-87062 A | 3/2006 |
| JP | 2007-043270 A | 2/2007 |
| JP | 2009-543487 A | 12/2009 |
| JP | 2010-41660 A | 2/2010 |
| JP | 2010-74657 A | 4/2010 |
| WO | 2009/145118 A1 | 12/2009 |

OTHER PUBLICATIONS

International Search Report for PCT/JP2011/071937 dated Jan. 24, 2012.

"N x M Expandable Multicast Switch Module", [online], 2008-2009, Website of Enablence Technologies Inc., [Date of Search: Jul. 27, 2010], internet <heetp://www.enablence.com/media/pdf/enablence_ims_multicast_switch.pdf>.

* cited by examiner

|    | λ1 | λ2 | λ3 | λ4 | λ5 | λ6 | λ7 | λ8 |
|----|----|----|----|----|----|----|----|----|
| P1 | #1 | #2 | #3 | #4 | #5 | #6 | #7 | #8 |
| P2 | #8 | #1 | #2 | #3 | #4 | #5 | #6 | #8 |
| P3 | #7 | #8 | #1 | #2 | #3 | #4 | #5 | #7 |
| P4 | #6 | #7 | #8 | #1 | #2 | #3 | #4 | #6 |
| P5 | #5 | #6 | #7 | #8 | #1 | #2 | #3 | #5 |
| P6 | #4 | #5 | #6 | #7 | #8 | #1 | #2 | #4 |
| P7 | #3 | #4 | #5 | #6 | #7 | #8 | #1 | #3 |
| P8 | #2 | #3 | #4 | #5 | #6 | #7 | #8 | #1 |

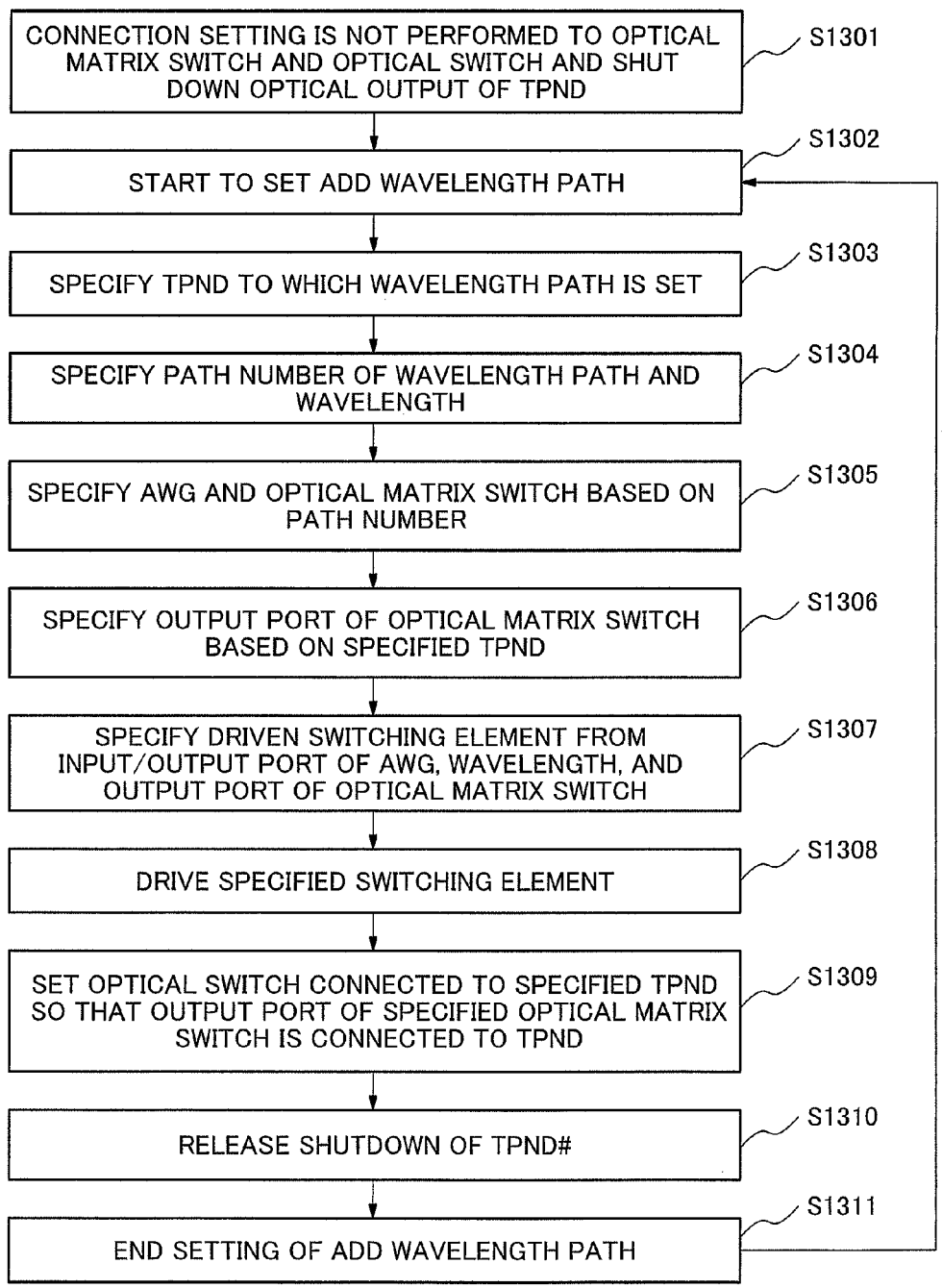

WAVELENGTH PATH MULTIPLEXING/DEMULTIPLEXING APPARATUS AND WAVELENGTH PATH MULTIPLEXING/DEMULTIPLEXING METHOD

CROSS REFERENCE TO RELATED APPLICATIONS

This application is a National Stage of International Application No. PCT/JP2011/071937 filed Sep. 20, 2011, claiming priority based on Japanese Patent Application No. 2010-213551 filed Sep. 24, 2010, the contents of all of which are incorporated herein by reference in their entirety.

TECHNICAL FIELD

The present invention relates to a wavelength path multiplexing/demultiplexing apparatus having a wavelength path multiplexing/demultiplexing function used in optical communication and a wavelength path multiplexing/demultiplexing method.

BACKGROUND ART

WDM (Wavelength Division Multiplexing) which provides a high capacity point-to-point connection and a ROADM (Reconfigurable Optical Add Drop Multiplexer) are introduced in an optical communication core network. Further, the WDM and the ROADM are being introduced to a Metro network and a regional network.

In the ROADM system in which the introduced WDM apparatus is used as a base platform, a transponder in a node is required to have a function to connect the transponder with a path by using an arbitrary optical path and an arbitrary wavelength.

As an optical device having a function to select a light signal from a plurality of light signals transmitted through a plurality of paths and output it to the transponder, a multicast switch described in non-patent document 1 is used. The non-patent document 1 describes a multicast switch which can connect four paths with eight transponders.

FIG. 8 is a figure for explaining operation of the multicast switch. In FIG. 8, for ease of explanation, a case in which transponders 804-1 to 804-4 are connected to a multicast switch 805 that can connect four paths with four transponders is shown. The multicast switch 805 described in FIG. 8 differs from the multicast switch described in non-patent document 1 in that up to four transponders can be connected. However, the basic operation of the multicast switch described in non-patent document 1 is the same as that of the multicast switch 805 described in FIG. 8.

In FIG. 8, a wavelength multiplexed light transmitted through each path is inputted to one of 1×4 splitters 801-1 to 801-4. The light inputted to one of the 1×4 splitters 801-1 to 801-4 is divided into four lights. Four divided wavelength multiplexed lights are inputted to 4×1 switches 802-1 to 802-4 whose number is equal to the number of the transponders, respectively. In FIG. 8, the number of the transponders connected to the multicast switch 805 is four. Therefore, four 4×1 switches are used.

The 4×1 switches 802-1 to 802-4 select one of the wavelength multiplexed lights inputted from the 1×4 splitters 801-1 to 801-4 and output the selected light to wavelength variable filters 803-1 to 803-4, respectively. The transmission wavelength of the wavelength variable filters 803-1 to 803-4 is set so that it is equal to the wavelength of the light to be received by the connected transponder. As a result, each of the transponders 804-1 to 804-4 receives only the light having a target wavelength that is extracted from a plurality of the lights included in the wavelength multiplexed light by the wavelength variable filters 803-1 to 803-4.

Here, the number of the 4×1 splitters 801-1 to 801-4 is made equal to the number of the paths. Each of the 4×1 optical switches selects the path that is used for communication by the transponder to which the 4×1 optical switches are connected.

The reception operation of the transponder has been described above by using FIG. 8. When the transponders 804-1 to 804-4 transmit the light, the 4×1 optical switches 802-1 to 802-4 switch the optical path so that the lights transmitted by the transponders 804-1 to 804-4 are transmitted to the splitters 801-1 to 801-4 connected to the predetermined optical path. As a result, the output of the transponder is outputted to the arbitrary optical path. This operation is the same as that of the multicast switch described in non-patent document 1 to which eight transponders can be connected.

As mentioned above, the multicast switch shown in FIG. 8 or non-patent document 1 can set the path to send the light transmitted through the arbitrary path to the arbitrary transponder and additionally, the same wavelength can be used in a plurality of optical paths.

Patent document 1 and patent document 2 describe structures in which the switching is performed by the optical switch while making the wavelength of the optical transmitter and receiver correspond to the wavelength of the transmission path.

PRIOR ART DOCUMENT

Patent Document

[Patent document 1] Japanese Patent Application Laid-Open No. 2010-041660
[Patent document 2] Japanese Patent Application Laid-Open No. 2001-318516

Non-Patent document

[non-patent document 1] "N×M Expandable Multicast Switch Module", [online], 2008-2009, Website of Enablence Technologies Inc., [Date of search: Jul. 27, 2010], internet,
<http://www.enablence.com/media/pdf/enablence_ims_multicast_sw itch.pdf>

DISCLOSURE OF THE INVENTION

Technical Problem

In the configuration shown in FIG. 8, the transponder receives the wavelength signals of all channels of the wavelength multiplexed signal in the path. Therefore, in an optical reception system using direct modulation, a filter through which only the signal having a target wavelength passes and which blocks the other signal having an undesired wavelength is required. In order to receive a signal having an arbitrary wavelength by the transponder, a wavelength variable filter has to be used. In this case, a sharp cutoff characteristic, a high side-lobe suppression ratio, and a high stability of a transmission center wavelength are required for the wavelength variable filter for receiving only the reception wavelength signal. Even when using the configuration described in non-patent document 1 in which the multicast switch is used, the wavelength variable filter has to be used for the filter in order to receive the arbitrary wavelength by the transponder.

Namely, in the configuration described in non-patent document 1 in which the multicast switch is used, in order to receive the arbitrary wavelength by the transponder, a high performance and high-cost wavelength variable filter is required and the required number of the wavelength variable filters is equal to the number of the reception wavelengths (the number of the transponders). Therefore, the configuration described in non-patent document 1 in which the multicast switch is used has a problem of a difficulty in reducing the apparatus cost.

Further, the wavelength variable filter usually includes a mechanical movable portion for varying a wavelength characteristic. For this reason, when such wavelength variable filter is used, a problem in which the size of the apparatus is increased, the reliability of the apparatus is reduced, and the integration of the optical circuits may become difficult occurs.

Patent document 1 and patent document 2 do not describe the configuration in which one of the light signals received through a plurality of paths is selected and outputted and do not disclose the configuration in which the transponder for transmitting and receiving the arbitrary wavelength is connected to the arbitrary path.

OBJECT OF THE INVENTION

The object of the invention of the present application is to provide a wavelength path multiplexing/demultiplexing apparatus which can connect the path to the transponder with low loss and whose cost can be reduced, size can be reduced, and reliability can be improved.

Technical Solution

The wavelength path multiplexing/demultiplexing apparatus of the invention of the present application comprises multiplexing/demultiplexing means having a multiplexing port through which a wavelength multiplexed light is inputted and outputted, and a demultiplexing port in which the wavelength multiplexed light is demultiplexed into the lights included in the wavelength multiplexed light based on the wavelength and through which the light is inputted and outputted, and first switch means which has a first port to which the demultiplexing port is connected, and a second port and connect the second port to one of the first ports, wherein, the demultiplexing port is connected to the first port of each of the first switch means and the first port is connected to the demultiplexing port of each of the multiplexing/demultiplexing means.

The wavelength path multiplexing/demultiplexing method of the invention of the present application comprises inputting and outputting a wavelength multiplexed light through a multiplexing port, demultiplexing the wavelength multiplexed light into the lights included in the wavelength multiplexed light based on the wavelength and inputting and outputting the is light through a demultiplexing port, connecting a second port to one of first ports to which the demultiplexing ports are connected, connecting the demultiplexing port to the first port that is different from each other, and connecting the first port to the demultiplexing port that is different from each other.

The recording medium for recording a control program of the invention of the present application, the recording medium records the control program which causes a computer of a wavelength path multiplexing/demultiplexing apparatus including multiplexing/demultiplexing means having a multiplexing port through which a wavelength multiplexed light is inputted and outputted, and a demultiplexing port in which the wavelength multiplexed light is demultiplexed into the lights included in the wavelength multiplexed light based on the wavelength and through which the light is inputted and outputted, and first switch means which have a first port to which the demultiplexing port is connected and a second port and connect the second port to one of the first ports to execute: a step of specifying the second port to which a wavelength path is set, a step of specifying the wavelength of the wavelength path that is set between the multiplexing port and the second port and the multiplexing port including the wavelength path, a step of specifying the multiplexing/demultiplexing means connected to the multiplexing port based on the specified multiplexing port, a step of specifying the demultiplexing port which can be connected to the second port via the first switch means, a step of specifying the demultiplexing port based on a relation between the wavelength of the wavelength path and the demultiplexing port, a step of setting the multiplexing/demultiplexing means so that the specified multiplexing port is connected to the specified demultiplexing port, and a step of performing a switching of the first switch means so that the second port is connected to the first port to which the specified demultiplexing port is connected.

Advantageous Effect of the Invention

The wavelength path multiplexing/demultiplexing apparatus and the wavelength path multiplexing/demultiplexing method of the invention of the present application have effects in which the path can be connected to the transponder with low loss, the cost of the apparatus can be reduced, the size of the apparatus can be reduced, and the reliability of the apparatus can be improved.

BRIEF DESCRIPTION OF THE DRAWINGS

FIG. 13 is a flowchart showing a procedure of a switch setting (Add wavelength path setting) of an optical matrix switch and an optical switch.

BEST MODE FOR CARRYING OUT THE INVENTION

First Exemplary Embodiment

Figure 1:
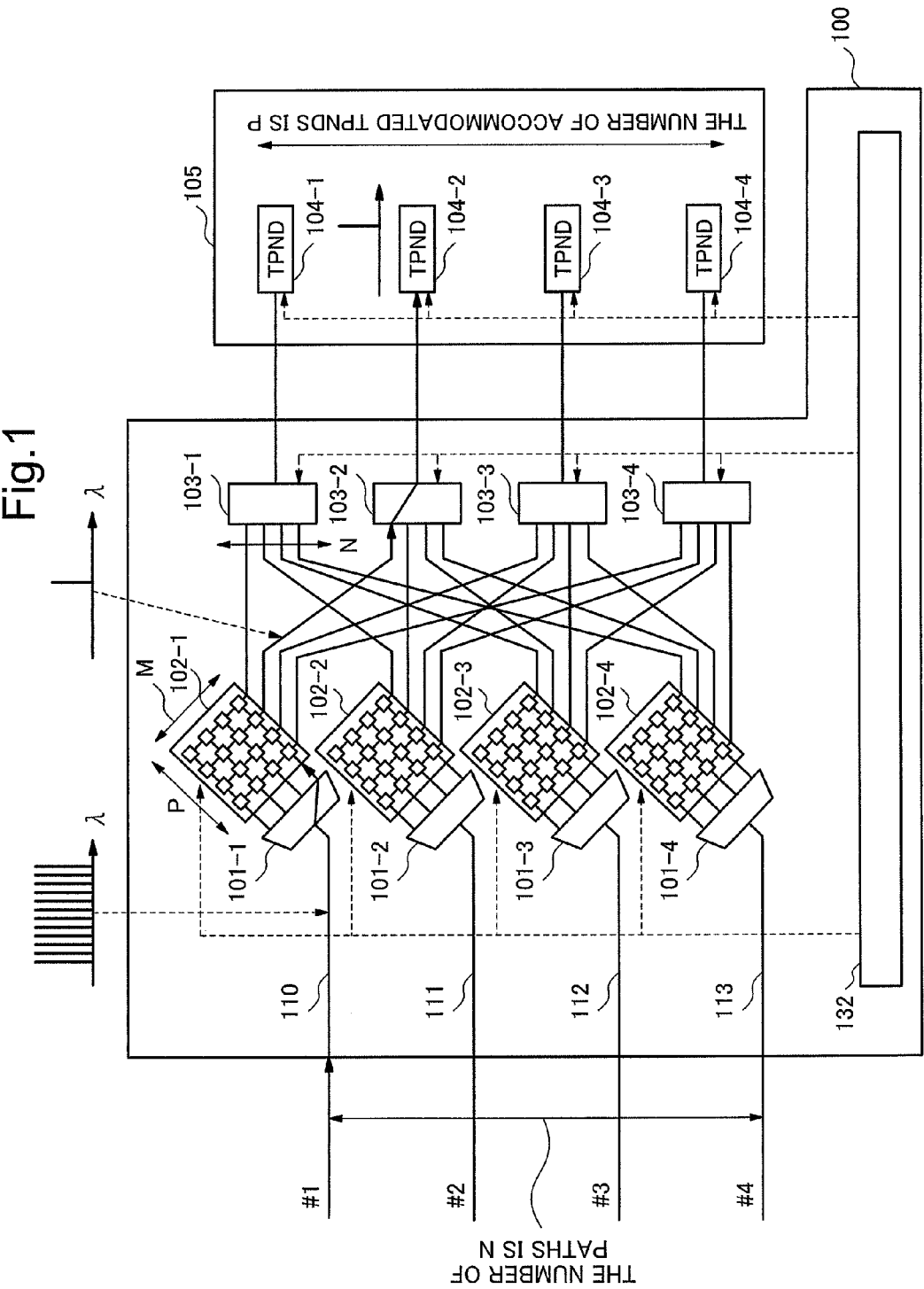
FIG. 1 is a figure showing an example of a configuration of a first exemplary embodiment of a wavelength path multiplexing/demultiplexing apparatus of the present invention.

Next, an exemplary embodiment of the present invention will be described in detail with reference to the drawing. First, one aspect of a configuration of a wavelength path network using a ROADM will be described with reference to FIG. 9 and FIG. 10.

Figure 9:
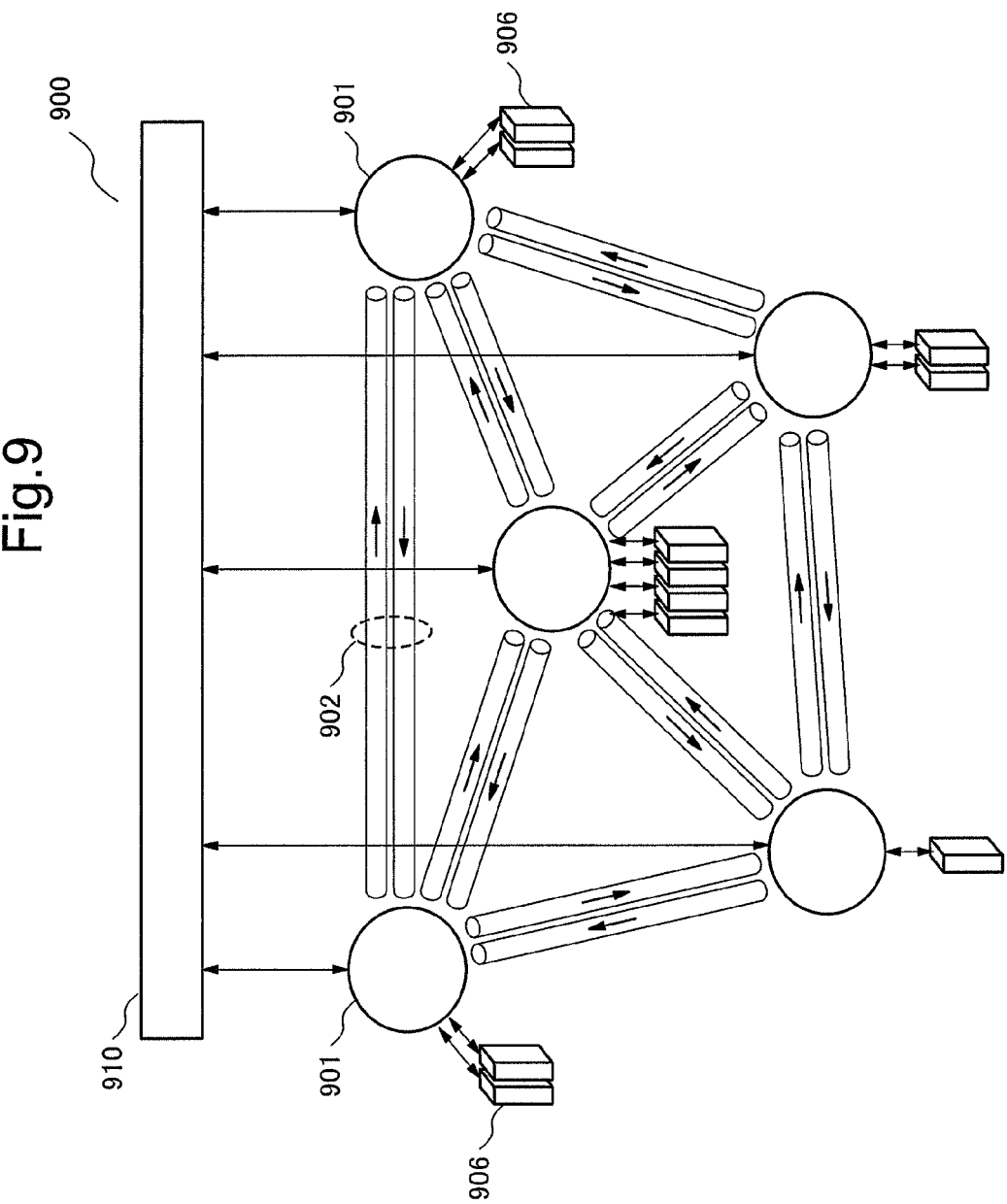
FIG. 9 is a figure showing one applicable embodiment of a wavelength path network of the present invention.

FIG. 9 is a figure showing one applicable embodiment of the wavelength path network of the present invention. In FIG. 9, a wavelength path network 900 includes a wavelength path multiplexing/demultiplexing optical transmission apparatus 901, a wavelength path network control unit 910, an optical fiber link 902, and a transponder 906. The transponder 906 transmits/receives a light signal to/from the transponder connected to another wavelength path multiplexing/demultiplexing optical transmission apparatus 901 via the wavelength path multiplexing/demultiplexing optical transmission apparatus 901 and the optical fiber link 902.

Figure 10:
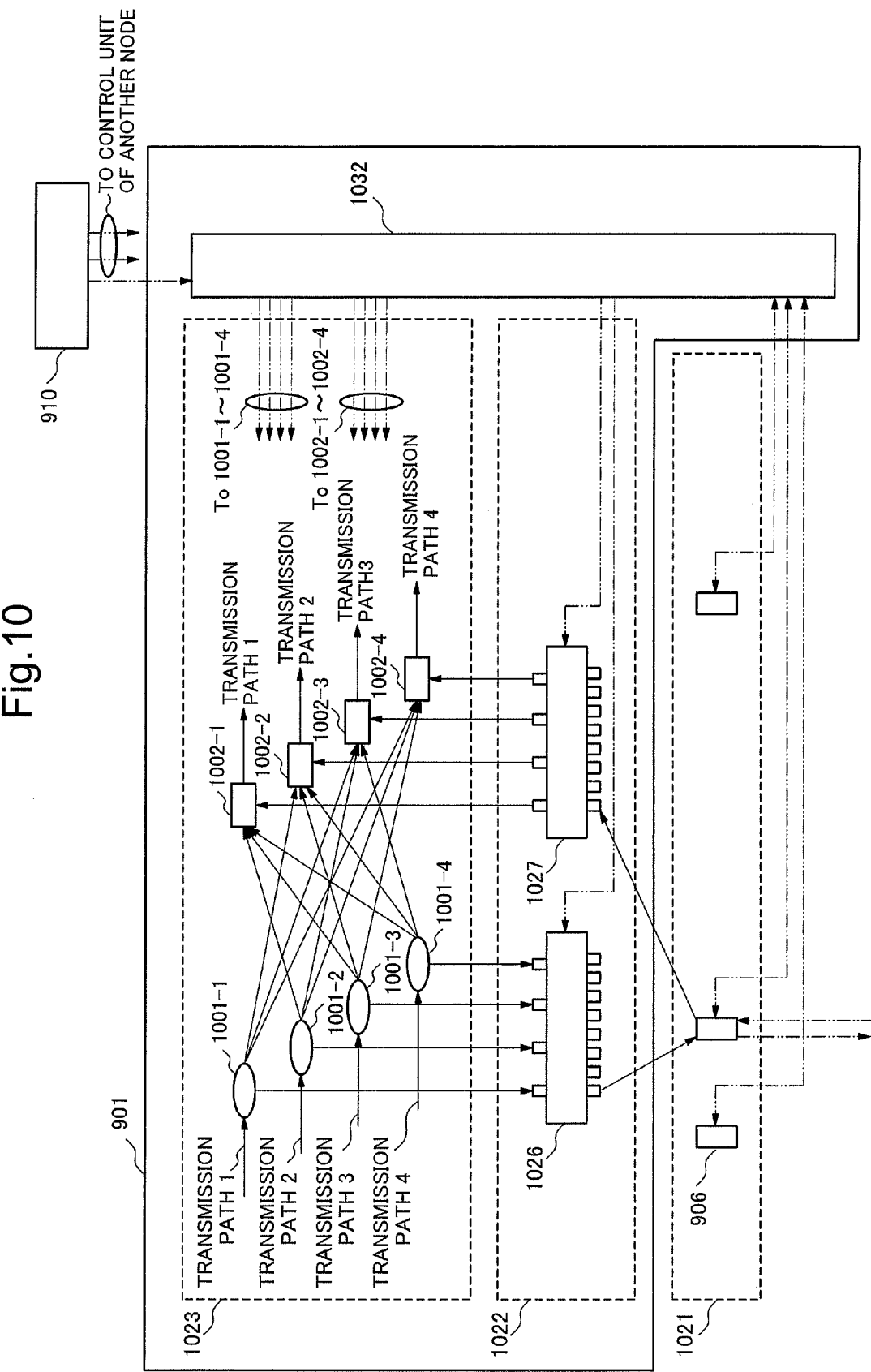
FIG. 10 is a figure for explaining a configuration of a wavelength path multiplexing/demultiplexing optical transmission apparatus in more detail.

FIG. 10 is a figure for explaining a configuration of the wavelength path multiplexing/demultiplexing optical transmission apparatus 901 shown in FIG. 9 in more detail. In FIG. 10, the wavelength path multiplexing/demultiplexing optical transmission apparatus 901 includes a wavelength path-line multiplexing/demultiplexing unit 1023, a wavelength path multiplexing/demultiplexing block 1022, and a control unit 1032. The wavelength path multiplexing/demultiplexing block 1022 includes wavelength path multiplexing/demultiplexing units 1026 and 1027. The configuration of the wavelength path multiplexing/demultiplexing unit 1026 is the same as the configuration of the wavelength path multiplexing/demultiplexing unit 1027.

The wavelength path multiplexing/demultiplexing unit 1026 is set the optical path of a dropped light that is dropped from one of predetermined transmission paths 1 to 4 by wavelength path branch circuits 1001-1 to 1001-4 of the wavelength path-line multiplexing/demultiplexing unit 1023 so that the dropped light is received by the transponder 906 provided in a transponder pool 1021.

Also, the wavelength path multiplexing/demultiplexing unit 1027 sets the optical path of the light transmitted by the transponder 906 provided in the transponder pool 1021 so that the transmitted light is added to one of the predetermined transmission paths 1 to 4 in wavelength path selection switch circuits 1002-1 to 1002-4 of the wavelength path-line multiplexing/demultiplexing unit 1023.

The control unit 1032 controls any units of the wavelength path multiplexing/demultiplexing optical transmission apparatus 901. Namely, the control unit 1032 controls the wavelength path branch circuits 1001-1 to 1001-4 and the wavelength path selection switch circuits 1002-1 to 1002-4 so that the predetermined light signal is dropped or added. Further, the control unit 1032 controls the wavelength path multiplexing/demultiplexing units 1026 and 1027 so that the wavelength path-line multiplexing/demultiplexing unit 1023 is connected to the transponder 906 through the predetermined optical path. Further, the control unit 1032 controls the operation of the transponder 906. For example, the control unit 1032 performs shutdown and release of the shutdown of the transponder 906 and releases it.

FIG. 1 is a figure showing an example of a configuration of the first exemplary embodiment of the wavelength path multiplexing/demultiplexing apparatus of the present invention. A wavelength path multiplexing/demultiplexing apparatus 100 shown in FIG. 1 corresponds to the wavelength path multiplexing/demultiplexing unit 1026 or the wavelength path multiplexing/demultiplexing unit 1027 shown in FIG. 9.

In FIG. 1, a transponder pool 105 is connected to the wavelength path multiplexing/demultiplexing apparatus 100. The transponder pool 105 accommodates four transponders 104-1 to 104-4. The wavelength path multiplexing/demultiplexing apparatus 100 sets the optical path of the transponder so that the transponder accommodated in the transponder pool 105 can perform communication through an arbitrary path by using an arbitrary wavelength.

The wavelength path multiplexing/demultiplexing apparatus 100 includes AWGs (Arrayed Waveguide Grating) 101-1 to 101-4, optical matrix switches 102-1 to 102-4, N×1 optical switches 103-1 to 103-4, and a control unit 132. The lights transmitted through N paths are inputted to the AWGs 101-1 to 101-4 through drop wavelength signal ports 110 to 113.

The general configuration shown in FIG. 1 will be described below. The transponder pool 105 accommodates P transponders 104-1 to 104-P (P is an integer greater than 1). The wavelength path multiplexing/demultiplexing apparatus 100 connects the transponders 104-1 to 104-P to the N paths (N is an integer greater than 1), each of which transmits the multiplexed light whose wavelength multiplexing number is M (M is an integer greater than 1).

In this case, the AWG 101 is a 1×M ports AWG. Further, the optical matrix switches 102-1 to 102-N are M×P optical matrix switches and the optical switches 103-1 to 103-P are N×1 optical switches.

In a configuration shown in FIG. 1, the number of the paths is 4 (N=4), the number of the wavelengths is 4 (M=4), and the number of the transponders is 4 (P=4). Namely, in FIG. 1, the AWG 101 is the 1×4 ports AWG, the optical matrix switches 102-1 to 102-4 are 4×4 optical matrix switches, and the optical switches 103-1 to 103-4 are 4×1 optical switches.

The AWG has a function to multiplex a plurality of lights whose wavelengths are different and to demultiplex the wavelength multiplexed light into a plurality of lights whose wavelengths are different. Namely, when the wavelength multiplexed light is inputted to a multiplexing side port of the AWG, the AWG demultiplexes the wavelength multiplexed light and outputs the demultiplexed lights whose wavelengths are different among demultiplexing side ports. Further, the AWG multiplexes the lights whose wavelengths are different each other that are inputted to the demultiplexing side ports and outputs the multiplexed light to the multiplexing side port.

In FIG. 1, the control unit 132 keeps information of connection relationship between the transponders 104-1 to 104-4 and the optical switches 103-1 to 103-4 and keeps connection relationship between the optical switches 103-1 to 103-4 and the optical matrix switches 102-1 to 102-4. Further, the control unit 132 outputs a signal for driving the optical matrix switches 102-1 to 102-4. And the control unit 132 keeps information of the wavelength that is outputted to each port of the optical switches 103-1 to 103-4 side by the optical matrix switches 102-1 to 102-4 for each driving state of the optical matrix switch.

Further, by using FIG. 1, a case in which the number of the paths is 4 (N=4), the number of the wavelengths is 4 (M=4), and the number of the transponders is 4 (P=4) will be described. However, these configurations do not limit the invention. Further, the following explanation does not mean that the effect of the first exemplary embodiment is obtained only when the configuration shown in FIG. 1 is used.

The following explanation can be applied to a case in which the number of the paths is N, the number of the wavelengths is M, and the number of the transponders is P. In this case, the wavelength path multiplexing/demultiplexing apparatus is comprised of N sets of 1×M ports AWG, N sets of M×P optical matrix switch, and P sets of N×1 optical switch.

[Description of the Operation]

The operation of the wavelength path multiplexing/demultiplexing apparatus of the first exemplary embodiment will be described with reference to FIG. 1.

The operation in which the wavelength path multiplexing/demultiplexing apparatus demultiplexes the wavelength multiplexed signal dropped from a path #1 whose wavelength multiplexing number is 4 into a plurality of lights and the transponder 104-2 receives the demultiplexed light having a wavelength λ1 will be described below.

The wavelength multiplexed light dropped from the path #1 is inputted to the multiplexing port of the AWG 101-1 through the drop wavelength signal port 110. The AWG 101-1 demultiplexes the wavelength multiplexed light whose wavelength multiplexing number is 4 into the lights whose wavelengths are λ1, λ2, λ3, and λ4. The demultiplexed lights are inputted to the optical matrix switch 102-1.

Figure 3:
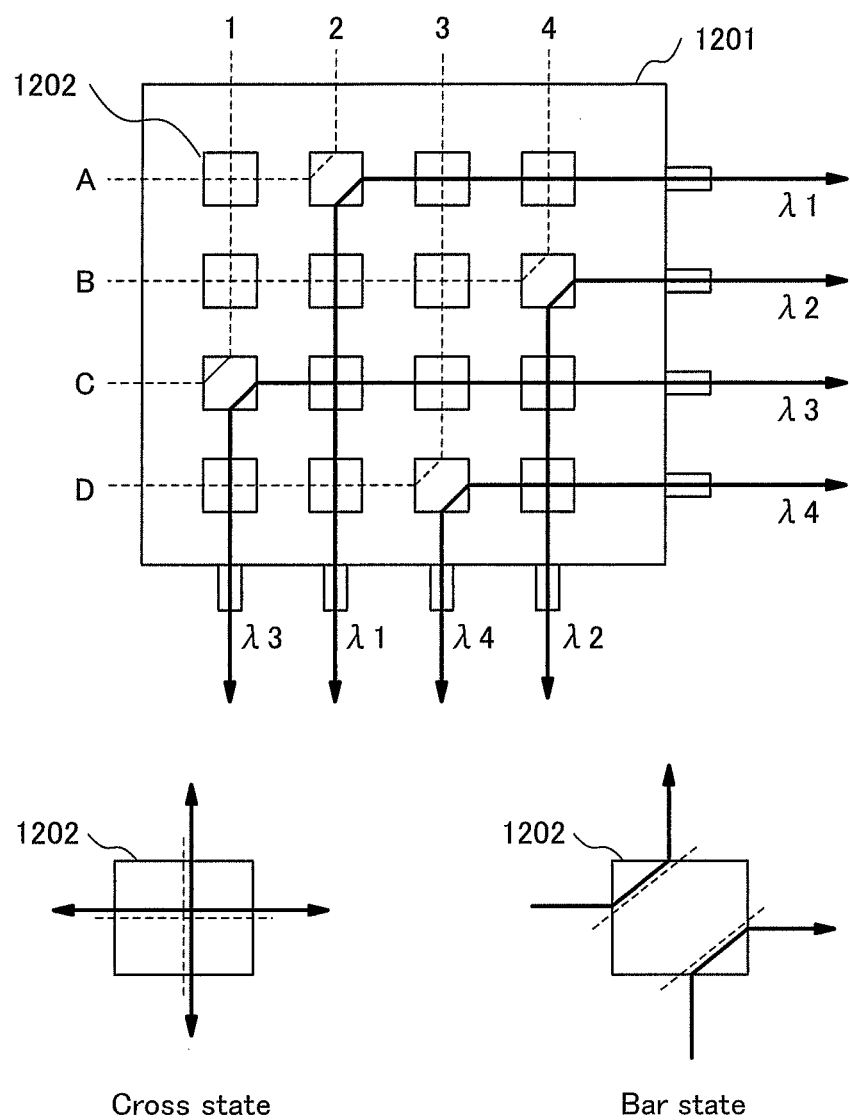
FIG. 3 is a figure for showing an example of a configuration of an optical matrix switch and explaining operation of a switching element.

FIG. 3 is a figure for showing a configuration of an optical matrix switch and explaining operation of a switching element. An optical matrix switch 1201 is a 4×4 optical matrix switch having 4 input ports and 4 output ports. The optical matrix switch 1201 corresponds to the optical matrix switches 102-1 to 102-4 shown in FIG. 1. The optical matrix switch 1201 is comprised of sixteen switching elements 1202. The switching element 1202 takes two states: a cross state in which the light goes straight inside the switching element and a bar state in which the optical path is bent inside the switching element. The states of the switching element can be individually controlled for each of sixteen switching elements by an external control signal. When making a connection between one of the input ports and one of the output ports in the optical matrix switch 1201, the state of the switching element located at an intersection point of two optical paths, one passes through the input port and the other passes through the output port, is set to the bar state.

In FIG. 1, the switching operation of the switching element of the optical matrix switch 102-1 is controlled by the control signal outputted by the control unit 132. The control unit 132 stores information on the port of the optical matrix switches 102-1 to 102-4 that are connected to the transponders 104-1 to 104-4 via the optical switches 103-1 to 103-4 and stores the transmission/reception wavelength of the transponders 104-1 to 104-4. Further, the control unit 132 stores information on the AWG connected to the optical matrix switches 102-1 to 102-4 and information on the path connected to the AWG. Furthermore, the control unit 132 stores information on the output port of the optical matrix switches 102-1 to 102-4 and the wavelength corresponding to it for each drive state of the switching element of the optical matrix switches 102-1 to 102-4.

The control unit 132 performs switching of the optical matrix switch 102-1 so that the optical path of the light having the wavelength λ1 is connected to the optical switch 103-2 to which the transponder 104-2 is connected. Further, the control unit 132 performs switching of the optical switch 103-2 so that the light having the wavelength λ1 that is dropped from the path #1 is outputted to the transponder 104-2. By performing the above operation, the transponder 104-2 can receive the light having the wavelength λ1 which is dropped from the wavelength multiplexed signal that is transmitted through the path #1.

Next, a procedure of switching the optical matrix switches 102-1 to 102-4 and the optical switches 103-1 to 103-4 in the wavelength path multiplexing/demultiplexing apparatus of the first exemplary embodiment will be described.

Figure 12:
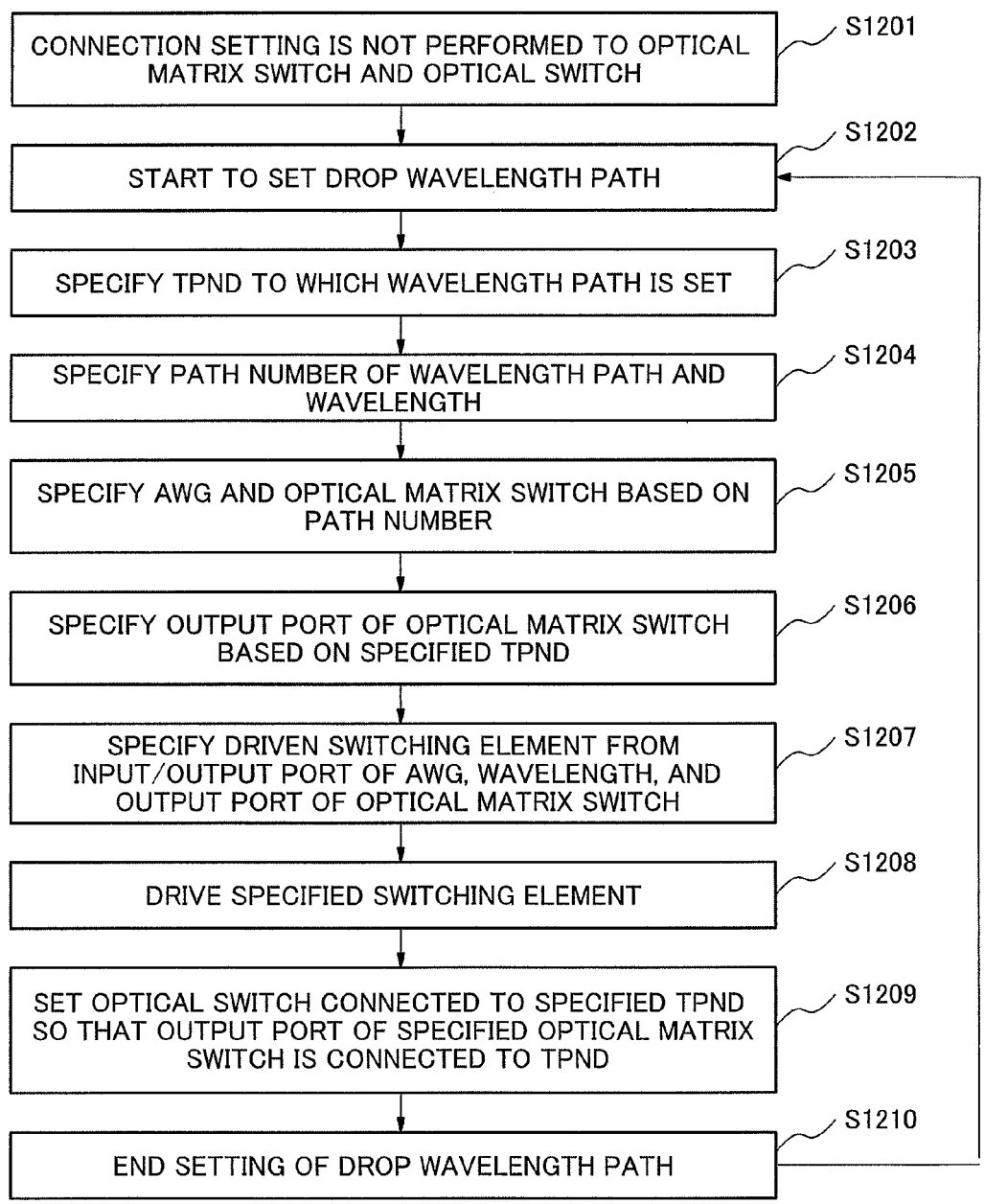
FIG. 12 is a flowchart showing a procedure of a switch setting (drop wavelength path setting) of an optical matrix switch and an optical switch.

FIG. 12 is a flowchart showing a procedure of a switch setting (drop wavelength path setting) of the optical matrix switch and the optical switch when the light transmitted through a predetermined transmission path is received by a specified transponder.

It is assumed that a connection setting of the optical matrix switches 102-1 to 102-4 and the optical switches 103-1 to 103-4 has not yet been set in an initial state (S1201 in FIG. 12). When the setting of the drop wavelength path is started (S1202), the transponder (TPND) to which the wavelength path is set is specified (S1203) and a path number to which the wavelength path is set and the wavelength are specified (S1204). In the above-mentioned example, the drop wavelength path is set so that the transponder 104-2 receives the light having the wavelength λ1 from the path number #1.

Based on the specified path number (#1), the AWG and the optical matrix switch that are connected to the path are specified (S1205). In the exemplary embodiment shown in FIG. 2, the AWG 101-1 and the optical matrix switch 102-1 are specified. The output port of the optical matrix switch 102-1 to which the specified transponder 104-2 can be connected via the optical switch 103-2 is specified (S1206).

The output port (that is the input port of the optical matrix switch) of the AWG is specified based on the wavelength arrangement of the input/output port of the AWG and the specified wavelength. Further, from the input/output port of the specified optical matrix switch, the switching element driven in order to output the signal having the wavelength λ1 to the specified transponder is specified (S1207). The specified switching element is driven (S1208) so that the input port is connected to the output port in the specified optical matrix switch.

The optical switch 103-2 connected to the transponder that is a setting target is performed (S1209) is switched so that the output port of the optical matrix switch 102-1 is connected to the transponder. By the above-mentioned operation, the drop wavelength path can be set. When the drop wavelength path setting is further going to be performed to another transponder, the procedure returns to the step S1202.

Further, the procedure of the step S1209 may be performed just after the procedure of the step S1206.

A case in which in the wavelength path multiplexing/demultiplexing apparatus, the light having the specific wavelength is dropped from a certain path and it is received by the transponder has been described above. The wavelength path multiplexing/demultiplexing apparatus 100 shown in FIG. 1 can be applied to a case in which the light transmitted by the transponder is added to the selected path. When a transponder adds a light, the traveling direction of the light in the wavelength path multiplexing/demultiplexing apparatus 100 is opposite to the traveling direction mentioned above. In this case, the wavelength path multiplexing/demultiplexing apparatus 100 provides a function of the wavelength path multiplexing/demultiplexing unit 1027 shown in FIG. 10.

FIG. 13 is a flowchart showing a procedure of the switch setting (add wavelength path setting) of the optical matrix switch and the optical switch when the light transmitted by the transponder is added to the predetermined path by using the wavelength path multiplexing/demultiplexing apparatus.

It is assumed that the connection setting of the optical matrix switches 102-1 to 102-4 and the optical switches 103-1 to 103-4 has not yet been set in an initial state. The light output of the transponder is shut down prior to performing the add wavelength path setting (S1301 in FIG. 13). When the add wavelength path setting is started (S1302), the transponder to which the wavelength path is set is specified (S1303), and the number of the path to which the wavelength path is set and the wavelength are specified (S1304).

The AWG and the optical matrix switch that are connected to the path are specified based on the specified path number (S1305). Further, the output port of the optical matrix switch is specified based on the specified transponder (S1306).

Then, the output port of the AWG, that is the input port of the optical matrix switch, is specified based on the wavelength arrangement of the input/output port of the AWG and the specified wavelength. Further, the switching element driven in order to output a light having the specified wavelength transmitted by the specified transponder, from the input port and the output port of the specified optical matrix switch to the port of the AWG that is assigned for the specified wavelength is specified (S1307).

Then, the specified switching element is driven so that the input port is connected to the output port in the specified optical matrix switch (S1308).

Then, the switching of the optical switch 103-2 connected to the transponder that is a setting target is performed so that the output port of the optical matrix switch is connected to the transponder (S1309). The shutdown of the transponder is released (S1310). By the above-mentioned operation, the add wavelength path can be set. When the add wavelength path setting is further going to be performed to another transponder, the procedure returns to the step S1302.

Further, the procedure of the step S1308 may be performed just after the procedure of the step S1305.

In the wavelength path multiplexing/demultiplexing apparatus shown in FIG. 1, by operating the optical switch according to the procedure explained with reference to FIG. 13, the transponder can transmit the light having the specified wavelength to the selected path. Namely, the wavelength path multiplexing/demultiplexing apparatus shown in FIG. 1 can realize both a function of the drop wavelength path setting and a function of the add wavelength path setting to the transponder by using the same configuration.

Further, the procedure shown in FIG. 12 and FIG. 13 may be executed by a computer provided in a wavelength path demultiplexing apparatus 100 by using a program. The program may be stored in a recording medium which can be read by the computer provided in the wavelength path demultiplexing apparatus 100. Further, the computer provided in the wavelength path demultiplexing apparatus 100 may download the program from the outside and execute it.

Up to P transponders can be connected to one wavelength path multiplexing/demultiplexing apparatus. Then, the wavelength path multiplexing/demultiplexing apparatus described in the first exemplary embodiment can drop the light having an arbitrary wavelength included in the wavelength multiplexed light transmitted through the arbitrary path. Therefore, the wavelength path multiplexing/demultiplexing apparatus described in the first exemplary embodiment can set the optical path to the transponder without obstructing a wavelength signal which has already been set to the arbitrary path with respect to up to P arbitrary wavelengths. Further, even when the transponder to which the wavelength and the path are set changes the wavelength and the path, the wavelength path multiplexing/demultiplexing apparatus described in the first exemplary embodiment can reset the wavelength or the path without obstructing the wavelength signal which has already been set.

As described above, the wavelength path multiplexing/demultiplexing apparatus of the first exemplary embodiment has combinations of the AWG and the optical matrix switch whose number is equal to the number of the add paths or the drop paths of the ROADM and further includes the optical switches for path switching whose number is equal to the number of the accommodated transponders. By connecting the optical matrix switch to the optical switch, a predetermined path is connected to the transponder. As a result, the wavelength path multiplexing/demultiplexing apparatus of the first exemplary embodiment can transmit/receive the light having the arbitrary wavelength to/from the arbitrary path without using the wavelength variable filter.

As a result, the wavelength path multiplexing/demultiplexing apparatus of the first exemplary embodiment makes the reduction of the cost, loss and size possible and consequently, a wavelength path multiplexing/demultiplexing apparatus of which the optical circuit can be easily integrated and the reliability can be improved can be realized.

Further, the configuration of the wavelength path multiplexing/demultiplexing apparatus 100 described with reference to FIG. 1 can also be described as a minimum configuration of the first exemplary embodiment, as described below.

The wavelength path multiplexing/demultiplexing apparatus 100 includes the multiplexing/demultiplexing means and the first switch means. The multiplexing/demultiplexing means includes the multiplexing ports (the drop wavelength signal ports 110 to 113) through which the wavelength multiplexed light is inputted and outputted and the demultiplexing ports (ports of the optical switches 103-1 to 103-4 side of the optical matrix switches 102-1 to 102-4) in which the wavelength multiplexed light is demultiplexed into the lights included in the wavelength multiplexed light based on the wavelength and through which the light is inputted and outputted. Here, the multiplexing/demultiplexing means correspond to the configuration in which the AWG and the optical matrix switch are connected to each other.

The first switch means (optical switches 103-1 to 103-4) includes a first port (a port of an optical matrix switch side) to which the demultiplexing port is connected and a second port (a port of a transponder side) through which the selected light among the lights inputted and outputted through the first port is inputted and outputted.

Then, the demultiplexing port is connected to the first port (the port of the optical matrix switch side) of each of the different first switch means (optical switches 103-1 to 103-4) and the first port is connected to the demultiplexing port of each of the different multiplexing/demultiplexing means.

According to including the multiplexing/demultiplexing means and the first switch means, the wavelength path multiplexing/demultiplexing apparatus 100 can demultiplex the wavelength multiplexed light into the lights included in the wavelength multiplexed light based on the wavelength and can input and output the selected light among the demultiplexed lights between the multiplexing port and the second port. As a result, the wavelength path multiplexing/demultiplexing apparatus having the above-mentioned minimum configuration can transmit/receive the light having the arbitrary wavelength to/from the arbitrary path without using the wavelength variable filter.

Second Exemplary Embodiment

Next, a second exemplary embodiment of the present invention will be described in detail with reference to the drawing. Further, in the explanation of the second exemplary embodiment, a difference between the first exemplary embodiment and the second exemplary embodiment is mainly described and the explanation of a part of the second exemplary embodiment that is the same as that of the first exemplary embodiment is omitted.

Figure 2:
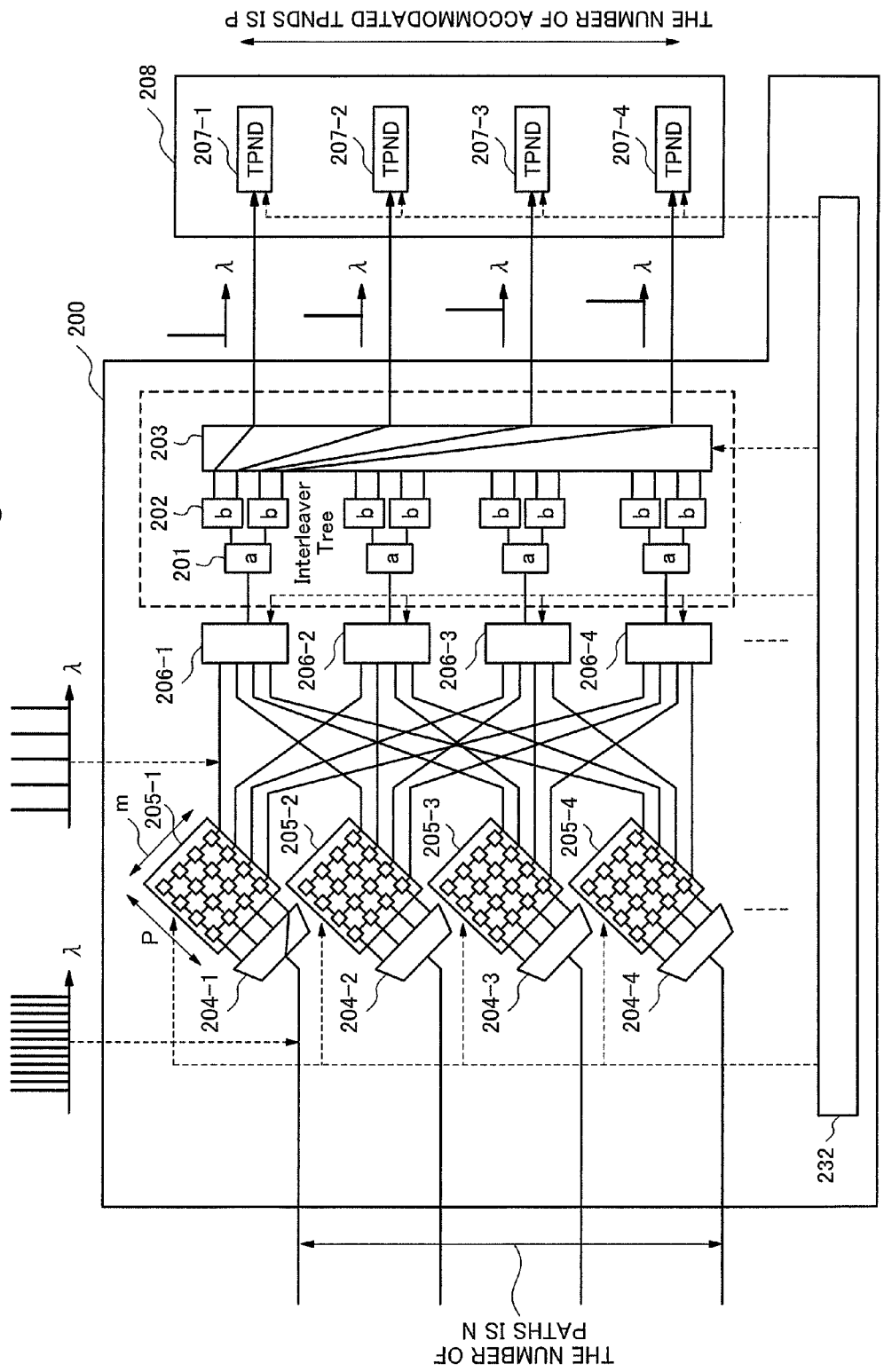
FIG. 2 is a figure showing an example of a configuration of a second exemplary embodiment of a wavelength path multiplexing/demultiplexing apparatus of the present invention.

FIG. 2 is a figure showing an example of a configuration of the second exemplary embodiment of the wavelength path multiplexing/demultiplexing apparatus of the present invention. The wavelength path multiplexing/demultiplexing apparatus 200 of the second exemplary embodiment shown in FIG. 2 differs from the wavelength path multiplexing/demultiplexing apparatus 100 of the first exemplary embodiment in including an interleaver a 201, an interleaver b 202, and an optical matrix switch 203. The wavelength path multiplexing/demultiplexing apparatus 200 of the second exemplary embodiment includes cyclic AWGs 204-1 to 204-N and optical matrix switches 205-1 to 205-N. The cyclic AWG will be described later.

Further, in FIG. 2, four paths, the 1×4 ports AWG, the 4×4 optical matrix switch, and four transponders are illustrated. However, the invention is not limited to the configuration shown in FIG. 2. The general configuration of the wavelength path multiplexing/demultiplexing apparatus of the second exemplary embodiment shown in FIG. 2 will be described below. A transponder pool 208 accommodates P transponders 207-1 to 207-P (P is an integer greater than 1). In the wavelength path multiplexing/demultiplexing apparatus 200, the transponders 207-1 to 207-P are connected to the N paths (N is an integer greater than 1), each of which transmits the multiplexed light whose wavelength multiplexing number is M (M is an integer greater than 1). The cyclic AWGs 204-1 to 204-N are 1×m ports cyclic AWGs. The value of m will be described later. Further, the optical matrix switches 205-1 to 205-N are m×P optical matrix switches and optical switches 206-1 to 206-P are N×1 optical switches.

A wavelength interval between light signals in the DWDM (Dense Wavelength Division Multiplexing) standardized by ITU-T (International Telecommunication Union Telecommunication Standardization Sector) is about several ten GHz to 100 GHz. The interleaver a 201 and the interleaver b 202 are narrow band filters which demultiplex the DWDM light signal standardized by ITU-T and output the demultiplexed light. In the second exemplary embodiment, it is assumed that an interval (an interleave interval) between transmission wavelength bands of the interleaver a is 100 GHz and an interval between transmission wavelength bands of the interleaver b is 200 GHz. Further, it is assumed that a transmission wavelength bandwidth of the interleaver a is about 50 GHz and a transmission wavelength bandwidth of the interleaver b is about 100 GHz.

Figure 11:
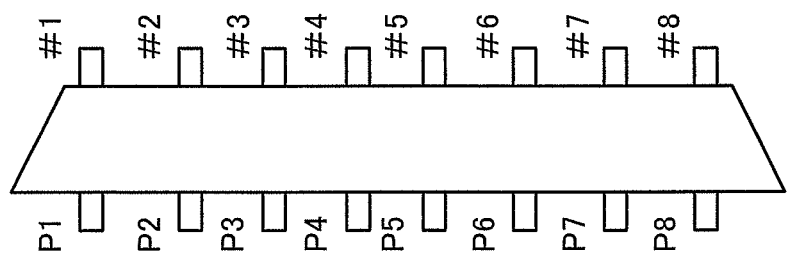
FIG. 11 is a figure showing a relation between an input/output port and wavelength of a cyclic AWG with 8 ports as an example.

FIG. 11 is a figure showing a relation between input/output ports and wavelengths (λ1, λ2, ... and, λ8) of the cyclic AWG with 8 ports as an example. For example, in FIG. 11, it is shown that when the light having the wavelength λ1 is inputted to the port #1 of the AWG, the light is outputted from a port P1. Similarly, it is shown that when the light having the wavelength λ2 is inputted to the port #1 of the AWG, the light is outputted from a port P2. Accordingly, when the wavelength multiplexed light in which the lights whose wavelengths are λ1, λ2, ..., and λ8 are multiplexed is inputted to the port #1, the AWG outputs the lights whose wavelengths are λ1, λ2, ..., and λ8 from the ports P1, P2, ..., and P8, respectively. When the wavelength multiplexed light in which the lights whose wavelengths are λ1, λ2, ..., and λ8 are multiplexed is inputted to the port #2, the AWG outputs the lights whose wavelengths are λ1, λ2, ..., and λ8 from the port P8 and the port P1 to the port 7, respectively.

When the numbers of the wavelengths inputted to the cyclic AWG is greater than the number of the ports, the cyclic AWG outputs the light in which a plurality of lights whose wavelengths are different are cyclically multiplexed from one port. It is possible to demultiplex the light transmitted from each port in which the lights are cyclically multiplexed into the lights whose wavelengths are different by using the interleaver. A configuration in which the wavelength multiplexed light outputted by the cyclic AWG is demultiplexed by the interleaver will be described by using FIG. 4.

Figure 4:
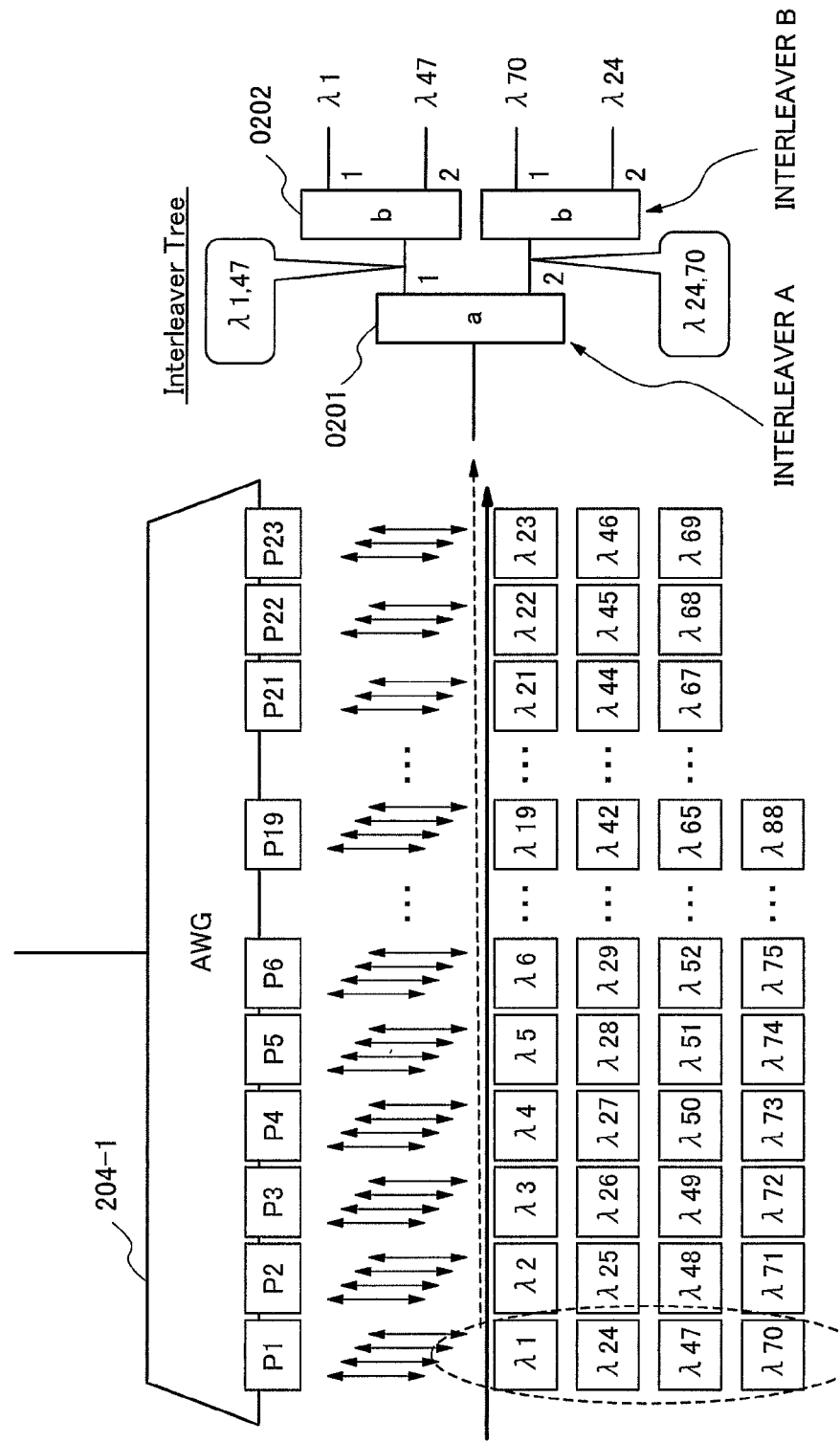
FIG. 4 is a figure for explaining wavelength demultiplexing operation in a second exemplary embodiment of a wavelength path multiplexing/demultiplexing apparatus of the present invention.

The relation between the input-output wavelength of each port of the AWG and a frequency filter characteristic of the interleaver a 201 and the interleaver b 202 when a 1×23 ports cyclic AWG is used for the cyclic AWG 204-1 is shown in FIG. 4. In FIG. 4, it is assumed that the number M of the wavelengths is 88 and the wavelength multiplexing number per the port of the cyclic AWG is 4. Further, it is assumed that the number of the ports of the cyclic AWG is 23.

Here, a subscript of the wavelength λ will be referred to as a wavelength number. The wavelength number is given to the wavelength in order of shorter to longer in the order of λ1, λ2, ....

When the wavelength multiplexed light in which the lights whose wavelengths are λ1, λ2, ..., and λ88 and wavelength intervals are equal to each other are multiplexed is inputted to the 1×23 ports cyclic AWG 204-1, as shown in FIG. 4, the transmission wavelength characteristic of the cyclic AWG shows a cyclicty of 23 wavelengths at each port. Namely, the lights whose wavelengths are λ1, λ24, λ47 and λ70 are inputted and outputted through the same port (port P1) of the cyclic AWG. Similarly, the lights whose wavelengths are λ2, λ25, λ48, and λ71 are inputted and outputted through the same port (port P2) of the cyclic AWG. The same manner is applied to the port P3 and other ports of the cyclic AWG.

Here, when the wavelength multiplexing number per one path is M and the wavelength multiplexing number per one port of the cyclic AWG is K, M is set to a multiple of K and the number m of the ports of the cyclic AWG is set to satisfy an equation of m=M/K+1. In FIG. 4, the number m of the ports of the cyclic AWG is 23 (=(88/4)+1). When the number m of the ports of the cyclic AWG is 23, for example, the lights whose wavelengths are λ1, λ24, λ47 and λ70 are outputted from the port P1. Namely, the light whose wavelength number is odd and the light whose wavelength number is even are alternately multiplexed and the multiplexed light is outputted from each port of the cyclic AWG.

Next, the drop operation of the wavelength path multiplexing/demultiplexing apparatus of the second exemplary embodiment of the present invention will be described by using FIG. 2, FIG. 4, and FIG. 5.

In the second exemplary embodiment, the multiplexed light in which the lights whose wavelength multiplexing number is a maximum of K are multiplexed reaches the optical switches 206-1 to 206-4. In the wavelength path multiplexing/demultiplexing apparatus of the second exemplary embodiment, the interleaver a and the interleaver b demultiplex these wavelength multiplexed lights and the optical path is connected so that the demultiplexed lights are inputted to the transponders 207-1 to 207-4.

In FIG. 2, a procedure to establish the connection between the cyclic AWG and the optical switch 206 via the optical matrix switch is the same as that of the first exemplary embodiment. In the second exemplary embodiment, the interleaver a 201 and the interleaver b 202 demultiplex the wavelength multiplexed light outputted by the cyclic AWG for each wavelength. The lights demultiplexed for each wavelength are inputted to the optical matrix switch 203 in order to establish the connection with the transponder. The number of the ports of the interleaver side of the optical matrix switch 203 is obtained by multiplying K (wavelength multiplexing number) by P (the number of transponders) and the number of the ports of the transponder side of the optical matrix switch 203 is P.

The operation of demultiplexing the wavelength multiplexed light outputted by the cyclic AWG for each wavelength will be described below by using the 1×23 ports cyclic AWG as an example.

In FIG. 4, when focusing on the port P1 of the cyclic AWG 204, the wavelength multiplexed light in which four lights whose wavelengths are λ1, λ24, λ47, and λ70 are multiplexed is outputted from the port P1 of the cyclic AWG 204. The interleaver a is arranged at a position closer to the cyclic AWG than the interleaver b.

Figure 5:
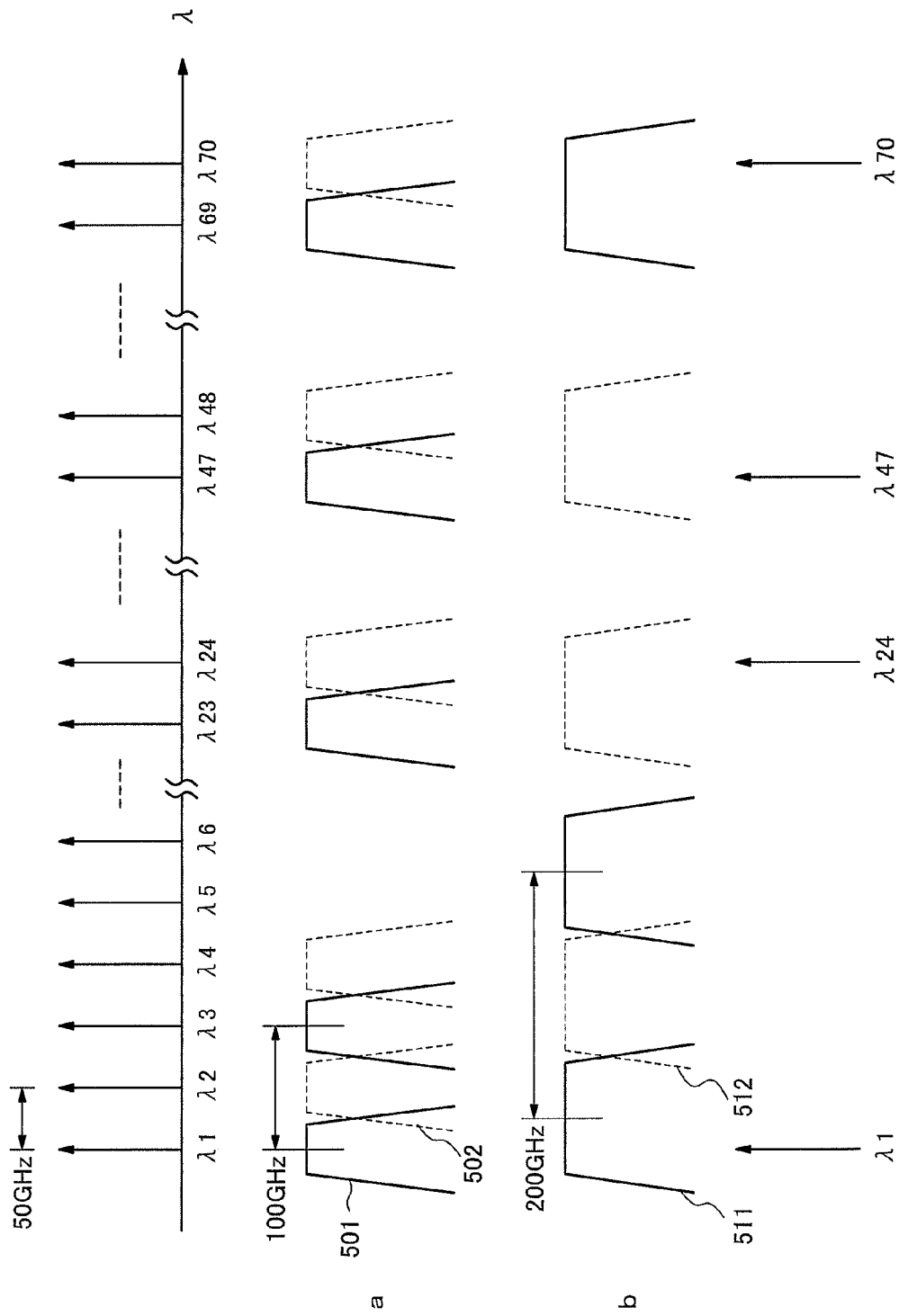
FIG. 5 is a figure for explaining a configuration in which a wavelength multiplexed light is demultiplexed for each wavelength by using an interleaver.

FIG. 5 is a figure for explaining a configuration in which the wavelength multiplexed light in which four lights whose wavelengths are λ1, λ24, λ47, and λ70 are multiplexed is demultiplexed for each wavelength by using the interleavers.

The interleaver a is composed of two interleavers having a transmission bandwidth of about 50 GHz and a frequency interval between the transmission bands of two interleavers is set to 100 GHz. The wavelength characteristic of two interleavers, of which the interleaver a is composed, is shown by a line (solid line) 501 and a line (dashed line) 502 in FIG. 5. When the frequency interval between two adjacent lights is 50 GHz and two interleavers having a transmission bandwidth of about 50 GHz are arranged so that a frequency interval between the transmission bands of two interleavers is 100 GHz, the interleaver can transmit only the light whose wavelength number is odd by setting the transmission center wavelength of the interleaver to the wavelength of the light whose wavelength number is odd (the wavelength characteristic 501 shown in FIG. 5). And the interleaver can transmit only the light whose wavelength number is even by setting the transmission center wavelength of the interleaver to the wavelength of the light whose wavelength number is even (the wavelength characteristic 502 shown in FIG. 5). By using two interleavers whose transmission center wavelengths are different from each other, the interleaver a can demutiplex the wavelength multiplexed light into the lights whose wavelength numbers are odd (λ1 and λ47) and the lights whose wavelength numbers are even (λ24 and λ70) when the wavelength multiplexed light in which four lights whose wavelengths are λ1, λ24, λ47 and λ70 are multiplexed is inputted to the interleaver a.

As described above, by setting the number m of the ports of the cyclic AWG so as to satisfy the equation of m=M/K+1, the light whose wavelength number is odd and the light whose wavelength number is even are alternately outputted from the port of the cyclic AWG. The interleaver a outputs the light in which the lights whose wavelengths are λ1 and λ47 are multiplexed to the interleaver b and further outputs the light in which the lights whose wavelengths are λ24 and λ70 are multiplexed to the interleaver b. Namely, the interleaver a demultiplexer the wavelength multiplexed light into the lights whose wavelength numbers are odd and the lights whose wavelength numbers are even and outputs them to the interleaver b.

On the other hand, the interleaver b is composed of two interleavers is having a transmission bandwidth of about 100 GHz and a frequency interval between the transmission bands of two interleavers is set to 200 GHz. The wavelength characteristic of two interleavers of which the comprise interleaver b is shown by a line (solid line) 511 and a line (dashed line) 512 in FIG. 5. The interleaver b can demultiplex the wavelength multiplexed light into the lights whose wavelength numbers are 1, 2, 5, 6, 9, 10, . . . and the lights whose wavelength numbers are 3, 4, 7, 8, 11, 12, . . . . Namely, generally, the interleaver b can demultiplex an wavelength group whose wavelength numbers are 4 n+1 or 4 n+2 (n is an integer equal to or greater than 0) and an wavelength group whose wavelength numbers are 4 n+3 or 4 (n+1). Accordingly, as shown in FIG. 4, the interleaver b can demultiplex the wavelength multiplexed light into the light having the wavelength λ1 and the light having the wavelength λ47 that are inputted by the interleaver a. Similarly, the interleaver b can demultiplex the wavelength multiplexed light into the light having the wavelength λ24 and the light having the wavelength λ70 that are inputted by the interleaver a. The configuration that a plurality of interleavers are arranged in a tree shape to demultiplex the wavelength multiplexed light is known and therefore detailed description will be omitted.

The lights whose wavelengths are λ1, λ24, λ47 and λ70 that are demultiplexed by the interleavers a and b are inputted to the optical matrix switch 203. The optical matrix switch 203 is controlled by a control unit 232 so that the target transponder can receive the light having the desired wavelength.

Further, when the add function, namely, the operation in which the transponder transmits the light signal, is performed, the light travels in a is direction opposite to the direction described in the above-mentioned explanation and therefore, the add operation can be performed by using the above-mentioned configuration.

As described above, in the wavelength path multiplexing/demultiplexing apparatus of the second exemplary embodiment, by using the 1×m ports cyclic AWG instead of the 1×M ports AWG used in the first exemplary embodiment, lights with a plurality of wavelengths are multiplexed at the wavelength demultiplexing port of the cyclic AWG. In the wavelength path multiplexing/demultiplexing apparatus of the second exemplary embodiment, the m×P optical matrix switch is used instead of the M×P optical matrix switch used in the first exemplary embodiment.

As a result, the number of the ports of the 1×m ports cyclic AWG is m/M times of the number of the ports of the 1×M ports AWG used in the first exemplary embodiment. Similarly, the number of the switching elements of the m×P optical matrix switch is m/M times of the number of the ports of the 1×M ports AWG and the number of the elements of the M×P optical matrix switch used in the first exemplary embodiment.

Namely, in the wavelength path multiplexing/demultiplexing apparatus of the second exemplary embodiment, the number of the ports of the AWG and the number of the switching elements of the optical matrix switch can be reduced in comparison with those of the first exemplary embodiment.

As a result, the wavelength path multiplexing/demultiplexing apparatus of the second exemplary embodiment has effects in which the size and the cost of the AWG and the optical matrix switch can be further reduced in addition to the effect of the first exemplary embodiment. Further, the wavelength path multiplexing/demultiplexing apparatus of the second exemplary embodiment has effects in which the loss of the optical matrix switch is reduced because the number of the elements used in the optical matrix switch through which the light passes is reduced.

Thus, in the wavelength path multiplexing/demultiplexing apparatus of the second exemplary embodiment, the number of the ports of the AWG and the number of the switching elements of the optical matrix switch combined with the AWG can be reduced in comparison with those of the first exemplary embodiment. Therefore, the wavelength path multiplexing/demultiplexing apparatus of the second exemplary embodiment has effects that the cost reduction of the apparatus, the size reduction of the apparatus and the integration of the optical circuit can be easily achieved.

Third Exemplary Embodiment

Next, a third exemplary embodiment of the present invention will be described in detail with reference to the drawing. In the following explanation, only the difference between the wavelength path multiplexing/demultiplexing apparatus of the third exemplary embodiment and the wavelength path multiplexing/demultiplexing apparatus of the second exemplary embodiment of the present invention will be described and the explanation of the part of the third exemplary embodiment that is the same as that of the second exemplary embodiment is omitted.

Figure 6:
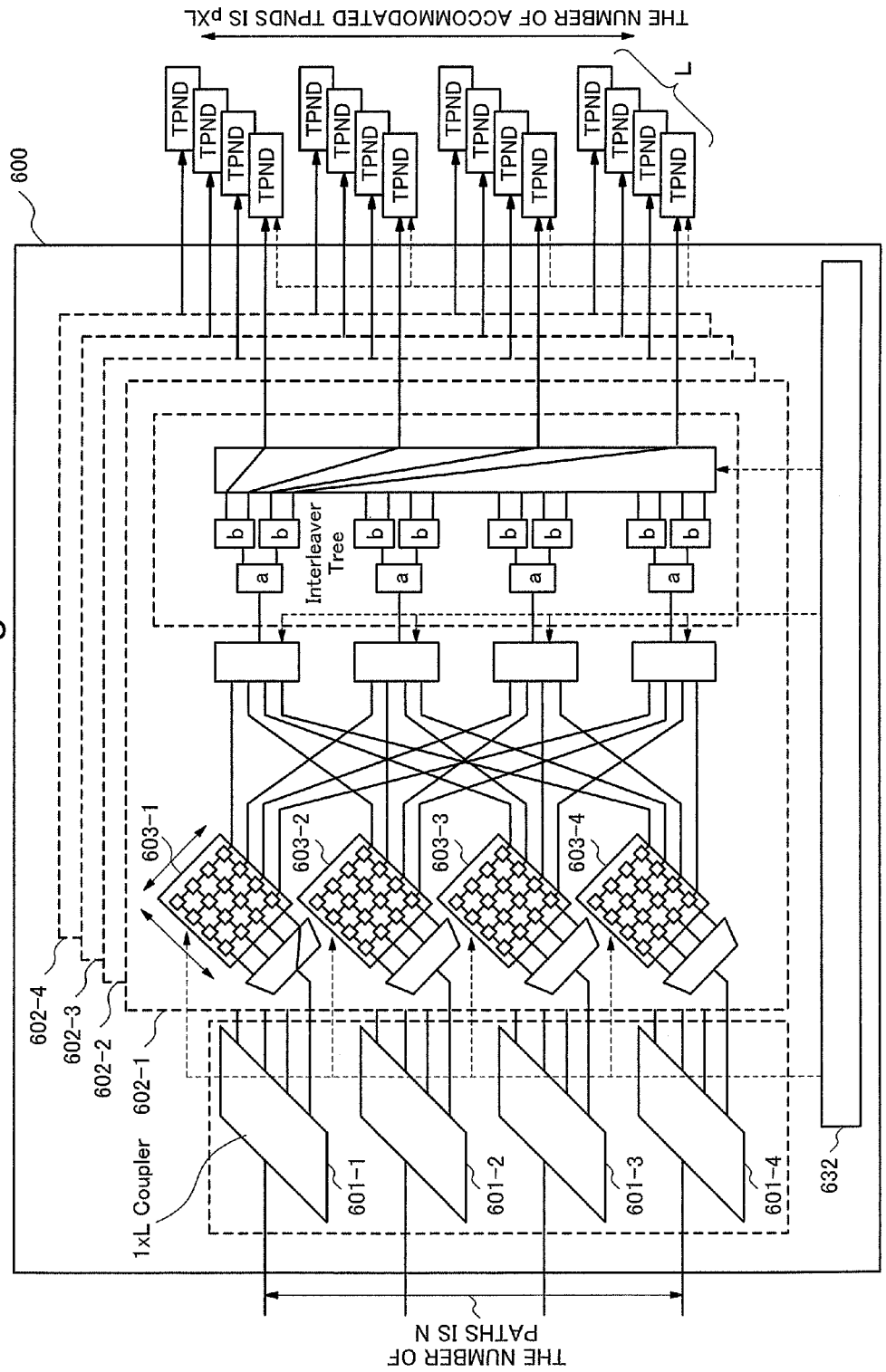
FIG. 6 is a figure showing an example of a configuration of a third exemplary embodiment of a wavelength path multiplexing/demultiplexing apparatus of the present invention.

FIG. 6 is a figure showing an example of a configuration of the third exemplary embodiment of the wavelength path multiplexing/demultiplexing apparatus of the present invention. The configuration of the wavelength path multiplexing/demultiplexing apparatus of the third exemplary embodiment will be described with reference to FIG. 6.

A wavelength path multiplexing/demultiplexing apparatus 600 of the third exemplary embodiment has a configuration in which a plurality of the wavelength path multiplexing/demultiplexing apparatuses 200 described in the second exemplary embodiment are provided in parallel as a sub accommodation function unit 602. A port of the path side of each of the sub accommodation function units 602 is connected to a branch port of an optical branch coupler 601 that divides the light into L lights. Further, in FIG. 6, L is equal to 4 and four 1×4 optical branch couplers 601-1 to 601-4 are indicated. However, in the third exemplary embodiment, the number of the branches of the optical branch coupler 601 is not limited to four.

The wavelength multiplexed light dropped from the transmission path is divided into L lights by the 1×L optical branch coupler and the divided lights are distributed to all the branch ports of the 1×L optical branch coupler.

The distributed lights are inputted to the sub accommodation function units 602-1 to 602-L, respectively. The operation in which the lights inputted to the sub accommodation function units 602-1 to 602-L are demultiplexed for each wavelength and the demultiplexed lights are transmitted to the transponders is the same as that of the second exemplary embodiment of the present invention and therefore the explanation is omitted. A control unit 632 controls the optical matrix switches and the optical switches of each sub accommodation function unit.

In the third exemplary embodiment, when the number of the transponders accommodated in one sub accommodation function unit 602 is p, the number P of all the transponders which can be accommodated in the wavelength path multiplexing/demultiplexing apparatus 600 is p×L. In is the third exemplary embodiment, the optical matrix switch provided in the sub accommodation function units 602-1 to 602-L is the M×p optical matrix switch. In FIG. 6, p is equal to 4 and L is equal to 4. Namely, the number of the transponders accommodated in one sub accommodation function unit is four and the optical branch coupler 601 is the 1×4 optical coupler. Accordingly, the number P of all the transponders which can be accommodated in the wavelength path multiplexing/demultiplexing apparatus 600 shown in FIG. 6 is 16. Further, optical matrix switches 603-1 to 603-4 are 4×4 optical matrix switches. However, as with the first exemplary embodiment and the second exemplary embodiment, the description of FIG. 6 does not limit the number of the ports of these optical parts which comprises the wavelength path multiplexing/demultiplexing apparatus of the third exemplary embodiment.

In the third exemplary embodiment, the wavelength path multiplexing/demultiplexing apparatus is divided into a plurality of the sub accommodation function units 602 by using the 1×L optical branch coupler 601, the number of the transponders accommodated in one sub accommodation function unit can be reduced by 1/L times. As a result, the number of the elements of the optical matrix switch is reduced by 1/L times because the number of the transponders that are connection destinations of the optical matrix switch provided in the sub accommodation function unit is reduced by 1/L times. As a result, the wavelength path multiplexing/demultiplexing apparatus of the third exemplary embodiment has effects that are the same as those of the first and second exemplary embodiments and further, the wavelength path multiplexing/demultiplexing apparatus of the third exemplary embodiment makes the reduction in the transmission loss of the optical matrix switch which is capable of reducing the size and the cost of the wavelength path multiplexing/demultiplexing apparatus possible.

Further, in the third exemplary embodiment, the structure in which the wavelength path multiplexing/demultiplexing apparatus of the second exemplary embodiment is combined with the 1×L optical branch coupler has been explained. However, by combining the wavelength path multiplexing/demultiplexing apparatus of the first exemplary embodiment with the 1×L optical branch coupler, the modified wavelength path multiplexing/demultiplexing apparatus of the third exemplary embodiment may be configured. In the modified wavelength path multiplexing/demultiplexing apparatus of the third exemplary embodiment, the wavelength path multiplexing/demultiplexing apparatus 100 described in the first exemplary embodiment functions as the sub function accommodation unit. Even when such configuration is used, in the modified wavelength path multiplexing/demultiplexing apparatus of the third exemplary embodiment, the number of the transponders that are connection destinations of the optical matrix switch provided in the sub accommodation function unit can be reduced by 1/L times. Accordingly, the wavelength path multiplexing/demultiplexing apparatus of the third exemplary embodiment has effects that are the same as those of the first exemplary embodiment and has effects in which the size and the cost of the apparatus can be further reduced. Additionally, in the wavelength path multiplexing/demultiplexing apparatus of the third exemplary embodiment, an improvement of the optical characteristic such as a reduction in the transmission loss of the optical matrix switch can be achieved.

Fourth Exemplary Embodiment

Next, a fourth exemplary embodiment of the present invention will be described in detail with reference to the drawing. In the following explanation, only the difference between the wavelength path multiplexing/demultiplexing apparatus of the fourth exemplary embodiment and the wavelength path multiplexing/demultiplexing apparatus of the second exemplary embodiment of the present invention will be described and the explanation of a part of the fourth exemplary embodiment that is the same as that of the second exemplary embodiment is omitted.

Figure 7:
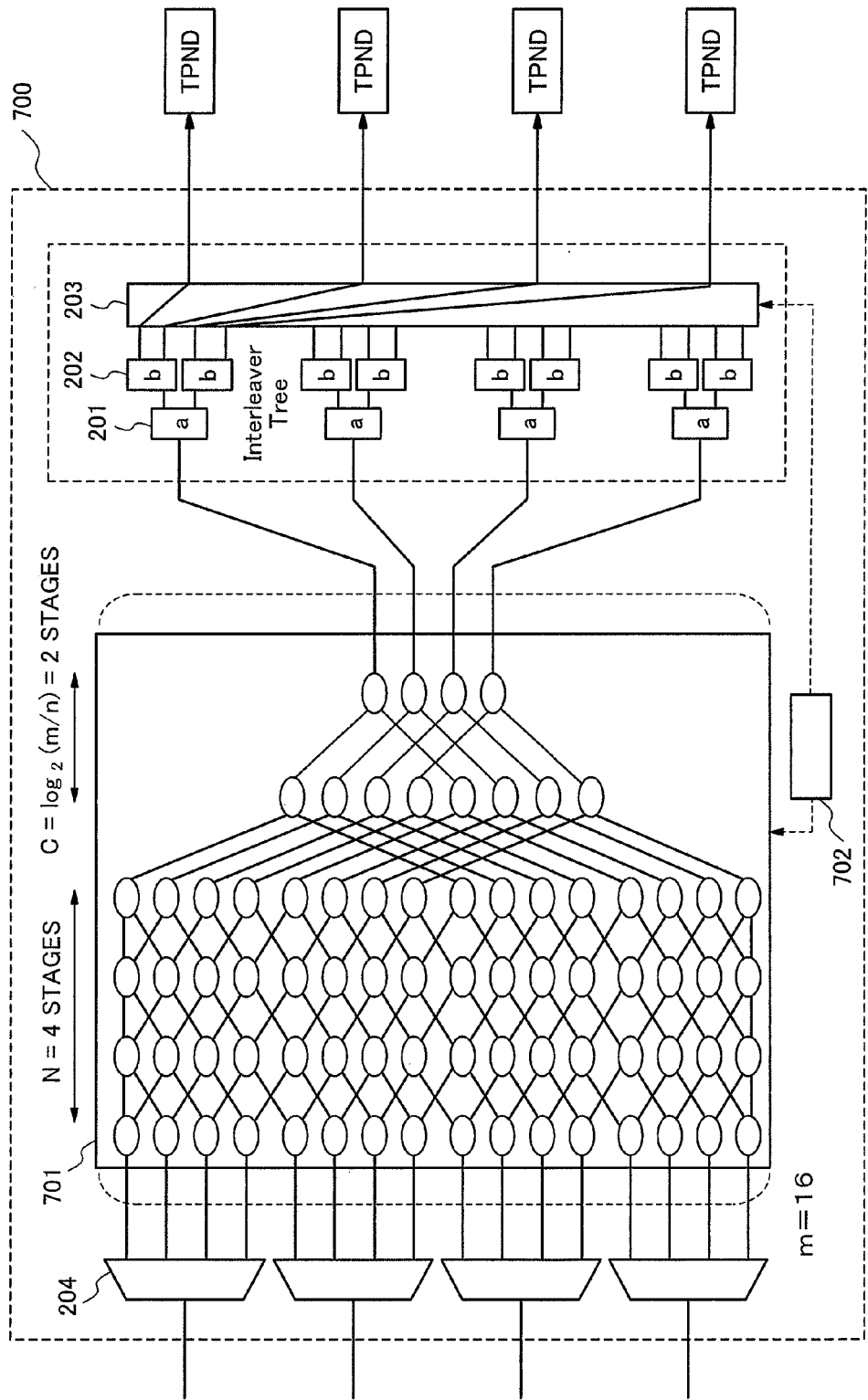
FIG. 7 is a figure showing an example of a configuration of a fourth exemplary embodiment of a wavelength path multiplexing/demultiplexing apparatus of the present invention.
Figure 8:
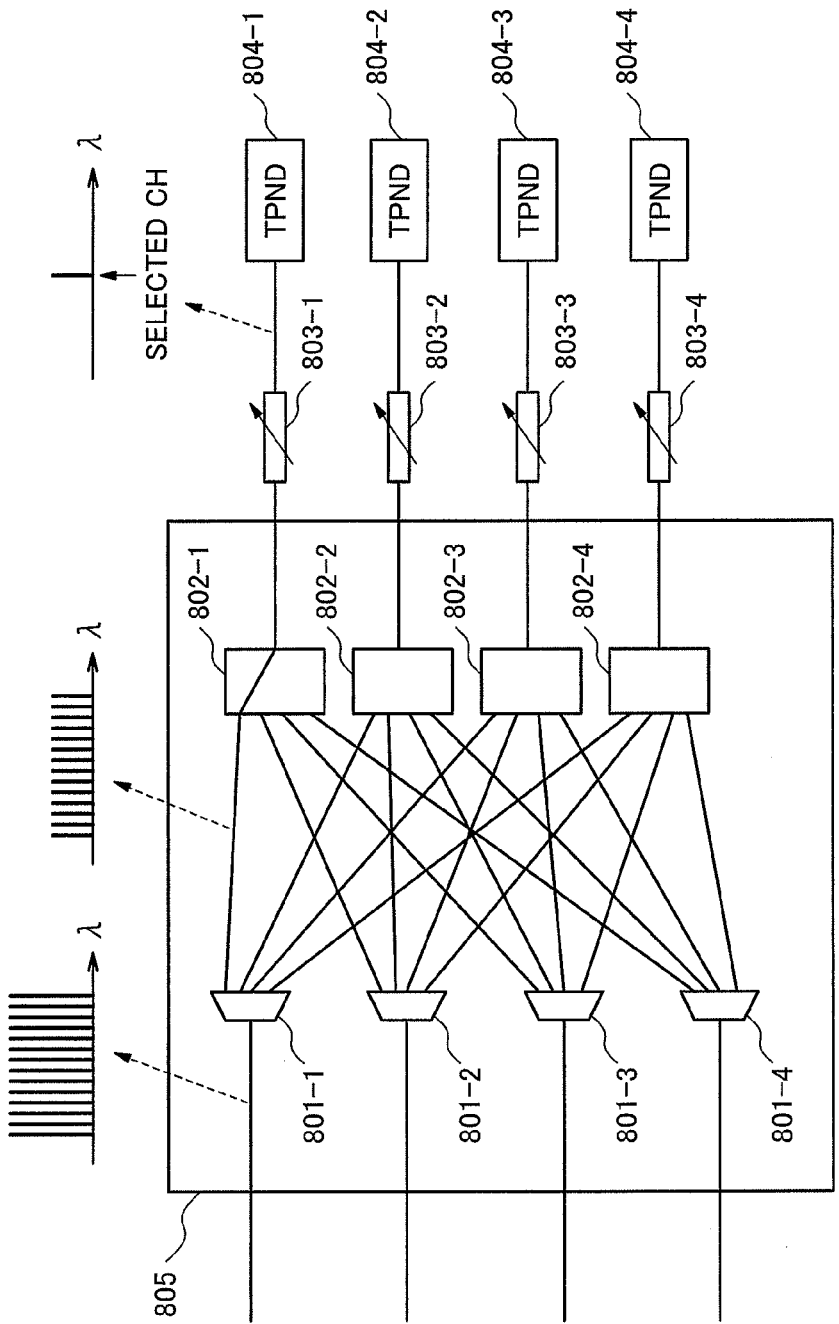
FIG. 8 is a figure for explaining operation of a multicast switch.

FIG. 7 is a figure showing an example of a configuration of the fourth exemplary embodiment of a wavelength path multiplexing/demultiplexing apparatus of the present invention. The configuration of the wavelength path multiplexing/demultiplexing apparatus of the fourth exemplary embodiment will be described with reference to FIG. 7.

A wavelength path multiplexing/demultiplexing apparatus 700 of the fourth exemplary embodiment has a configuration in which the optical matrix switches 205-1 to 205-N and the optical switches 206-1 to 206-P among the components of the wavelength path multiplexing/demultiplexing apparatus described in the second exemplary embodiment are replaced with an optical switch 701. Here, the optical switch 701 is formed by integrating the optical matrix switches 205-1 to 205-N and the optical switches 206-1 to 206-P. Further, in the wavelength path multiplexing/demultiplexing apparatus 700 of the fourth exemplary embodiment, the interleaver a 201, the interleaver b 202, and the optical matrix switch 203 that are described in the second exemplary embodiment are further integrated in the optical switch 701. A control unit 702 controls the optical switch 701 and the optical matrix switch 203.

The optical switch 701 is a M1×N optical switch comprised of 2×2 switching elements and 2×1 switching elements. Here, M1 is the total number of the output ports of the AWG for all the paths. The optical switch 701 is configured with N stages of the 2×2 switching element and C stages ($C=\log_2 (M1/N)$) of the 2×1 switching element so that the optical switch 701 can establish the interconnection between M output ports of the AWG for all the paths and N ports, where N is equal to the number of the transponders, with non-blocking (without blocking) the optical path. However, the values of M1 and N are determined so as to satisfy that the value of $\log_2 (M1/N)$ is an integer.

In FIG. 7, as with the first exemplary embodiment, the number M of the wavelengths per one path is 4, the number N of the paths is 4, and the number P of the transponders is 4. Accordingly, the total number M1 of the output ports of the AWGs of all the paths is 16 (=M×N). Namely, the optical switch 701 is a 16×4 optical switch. Accordingly, the number of the stages of the 2×2 switching element is 4. Further, the number of the stages of the 2×1 optical switch is 2 because C is equal to 2 (=$\log_2 (16/4)$). However, as with the first to the third exemplary embodiments, the configuration condition of the wavelength path multiplexing/demultiplexing apparatus of the fourth exemplary embodiment is not limited to the configuration shown in FIG. 7.

As described above, the wavelength path multiplexing/demultiplexing apparatus of the fourth exemplary embodiment, integrates the optical matrix switches 205-1 to 205-N and the optical switches 206-1 to 206-P of the second exemplary embodiment and replaces it by the optical switch 701. Further, in the wavelength path multiplexing/demultiplexing apparatus of the fourth exemplary embodiment, the interleaver a 201, the interleaver b 202, and the optical matrix switch 203 are integrated with the optical switch 701. By using this configuration, the wavelength path multiplexing/demultiplexing apparatus of the fourth exemplary embodiment has effects that are the same as those of the second exemplary embodiment, and has effects in which the size and the cost of the wavelength path multiplexing/demultiplexing apparatus can be further reduced by the integration.

Further, by integrating the optical parts used in the wavelength path multiplexing/demultiplexing apparatus of the fourth exemplary embodiment, the wavelength path multiplexing/demultiplexing apparatus on a reception side and a transmission side that is connected to the transponder can be configured with one chip. Accordingly, the wavelength path multiplexing/demultiplexing apparatus of the fourth exemplary embodiment has an effect in which the size of the wavelength path multiplexing/demultiplexing optical transmission apparatus can be further reduced.

The invention of the present application has been described above with reference to the exemplary embodiment; however, the invention of the present application is not limited to the exemplary embodiment mentioned above. Various changes in the configuration or details of the invention of the present application that can be understood by those skilled in the art can be made without departing from the scope of the invention.

This application claims priority based on Japanese Patent Application No. 2010-213551 filed on Sep. 24, 2010, the disclosure of which is hereby incorporated by reference in its entirety.

DESCRIPTION OF SYMBOL 100, 200, 600, and 700 wavelength path multiplexing/demultiplexing apparatus
132, 232, 632, and 702 control unit
101-1 to 101-4 AWG
204-1 to 204-4 cyclic AWG
102-1 to 102-4 optical matrix switch
205-1 to 205-4 optical matrix switch
603-1 to 603-4 optical matrix switch
103-1 to 103-4 optical switch
206-1 to 206-4 optical switch
104-1 to 104-4 transponder
207-1 to 207-4 transponder
105 and 208 transponder pool
601-1 to 601-4 optical branch coupler
602-1 to 602-4 sub accommodation function unit
701 optical switch
110 to 113 drop wavelength signal port
201 interleaver a
202 interleaver b
203 optical matrix switch
801-1 to 801-4 1×4 splitter
802-1 to 802-4 4×1 switch
803-1 to 803-4 wavelength variable filter
804-1 to 804-4 transponder
805 multicast switch
900 wavelength path network
901 wavelength path multiplexing/demultiplexing optical transmission apparatus
902 optical fiber link
906 transponder
910 wavelength path network control unit
1021 transponder pool
1022 wavelength path multiplexing/demultiplexing block
1023 wavelength path-line multiplexing/demultiplexing unit
1002-1 to 1002-4 wavelength path selection switch circuit
1001-1 to 1001-4 wavelength path branch circuit
1026 and 1027 wavelength path multiplexing/demultiplexing unit
1032 control unit 1201 optical matrix switch
1202 switching element

The invention claimed is:

1. A wavelength path multiplexing/demultiplexing apparatus comprising:
a multiplexing/demultiplexing unit that has a multiplexing port through which a wavelength multiplexed light is inputted and outputted, and a demultiplexing port in which said wavelength multiplexed light is demultiplexed into the lights included said wavelength multiplexed light based on the wavelength and through which the light is inputted and outputted; and
a first switch that has a first port to which said demultiplexing port is connected and a second port and in which said second port is connected to one of said first ports;
wherein said demultiplexing port is connected to said first port of each of said first switch unit and said first port is connected to said demultiplexing port of each of said multiplexing/demultiplexing unit;
wherein said multiplexing/demultiplexing unit comprises:
a first wavelength-multiplexing/demultiplexing unit that comprises a multiplexing port through which the wavelength multiplexed light is inputted and outputted and a demultiplexing port through which the lights included in said wavelength multiplexed light are inputted and outputted while corresponding to the wavelength; and
a second switch unit that has a third port and a fourth port and in which a connection relationship between said third port and said fourth port can be changed in said second switch unit,
wherein said demultiplexing port is connected to said third port and said fourth port is connected to said first port;
wherein when the number of said multiplexing/demultiplexing unit is N, the total number of the wavelengths used in said multiplexing/demultiplexing unit is M, and a value of $\log_2 (M/N)$ is an integer; and
wherein said first switch unit and said second switch unit include a single M×N optical matrix switch in which N stages of said 2×2 optical switching element is connected to $\log_2 (M/N)$ stages of said 2×1 optical switching element.

2. A wavelength path multiplexing/demultiplexing apparatus comprising:
a multiplexing/demultiplexing unit that has a multiplexing port through which a wavelength multiplexed light is inputted and outputted, and a demultiplexing port in which said wavelength multiplexed light is demultiplexed into the lights included said wavelength multiplexed light based on the wavelength and through which the light is inputted and outputted; and
a first switch that has a first port to which said demultiplexing port is connected and a second port and in which said second port is connected to one of said first ports;
wherein said demultiplexing port is connected to said first port of each of said first switch unit and said first port is connected to said demultiplexing port of each of said multiplexing/demultiplexing unit;
wherein said multiplexing/demultiplexing unit comprises:
a first wavelength-multiplexing/demultiplexing unit that comprises a multiplexing port through which the wavelength multiplexed light is inputted and outputted and a demultiplexing port through which the lights included in said wavelength multiplexed light are inputted and outputted while corresponding to the wavelength; and
a second switch unit that has a third port and a fourth port and in which a connection relationship between said third port and said fourth port can be changed in said second switch unit,
wherein said demultiplexing port is connected to said third port and said fourth port is connected to said first port;
wherein said wavelength path multiplexing/demultiplexing apparatus further includes second wavelength-multiplexing/demultiplexing unit and third switch unit comprising a fifth port and a sixth port, and in which a connection relationship between said fifth port and said sixth port can be changed in said third switch unit; and
wherein said first wavelength-multiplexing/demultiplexing unit is cyclic AWG of which a wavelength of the light inputted and outputted through said demultiplexing port shows a periodicity,
said second wavelength-multiplexing/demultiplexing unit is disposed between said second port and said fifth port,
said second wavelength-multiplexing/demultiplexing unit transmits/receives the light inputted and outputted through said second port to/from said fifth ports that are different for each wavelength, and
said third switch unit connects one of said fifth ports to one of said sixth ports.

3. The wavelength path multiplexing/demultiplexing apparatus according to claim 2, wherein when a maximum value of the number of the wavelengths of the light inputted and outputted through said demultiplexing port is K (K is a positive integer), and a maximum value of the number of the wavelengths of said wavelength multiplexed light is M (M is an integer equal to or greater than 2 and a multiple of K), the number m of the ports of said cyclic AWG is represented by a formula $m=(M/K)+1$.

4. The wavelength path multiplexing/demultiplexing apparatus according to claim 2, wherein a plurality of said second wavelength-multiplexing/demultiplexing units are connected to said fifth port.

* * * * *